US012806530B2

(12) United States Patent
Ackland et al.

(10) Patent No.: US 12,806,530 B2
(45) Date of Patent: Nov. 24, 2026

(54) DETERMINING ACTIVITIES TO BE PERFORMED BY NON-PLAYER CHARACTERS IN AN INTERACTIVE EXPERIENCE BASED ON EMERGENT LORE

(71) Applicant: Meaning Machine LTD, Bristol (GB)

(72) Inventors: Benjamin Frederick Ackland, Bristol (GB); Daniel Harborne, Edinburgh (GB); Thomas Keane, London (GB); Simon Rawles, Bristol (GB)

(73) Assignee: Meaning Machine Ltd, Bristol (GB)

( * ) Notice: Subject to any disclaimer, the term of this patent is extended or adjusted under 35 U.S.C. 154(b) by 88 days.

(21) Appl. No.: 18/949,443

(22) Filed: Nov. 15, 2024

(65) Prior Publication Data

US 2026/0138029 A1 May 21, 2026

(51) Int. Cl.
*A63F 13/67* (2014.01)
*A63F 13/69* (2014.01)

(52) U.S. Cl.
CPC .............. *A63F 13/67* (2014.09); *A63F 13/69* (2014.09); *A63F 2300/6027* (2013.01); *A63F 2300/65* (2013.01)

(58) Field of Classification Search
None
See application file for complete search history.

(56) References Cited

U.S. PATENT DOCUMENTS

2024/0424405 A1* 12/2024 Rao .......................... A63F 13/47
2025/0161813 A1* 5/2025 Chew ....................... A63F 13/56
2026/0097313 A1* 4/2026 Whitcomb .............. A63F 13/67

FOREIGN PATENT DOCUMENTS

CN 118079400 A 5/2024

* cited by examiner

*Primary Examiner* — Damon J Pierce
(74) *Attorney, Agent, or Firm* — SankerIP

(57) ABSTRACT

The invention relates to determining activities to be performed by non-player characters (NPC) in an interactive experience, e.g. video game. Activities, e.g. dialogue, are generated using generative machine learning models using a received input activity from a player, an entire established context/lore within the experience, and a set of activity history within the experience, as input. The invention involves updating the entire established context/lore based on a comparison of semantic content of the entire established context and semantic content of the generated activity of the NPC. The invention involves determining subsequent activities to be performed by NPCs based on the updated entire established context/lore, thereby providing consistency within the experience.

20 Claims, 9 Drawing Sheets

DETERMINING ACTIVITIES TO BE PERFORMED BY NON-PLAYER CHARACTERS IN AN INTERACTIVE EXPERIENCE BASED ON EMERGENT LORE

TECHNICAL FIELD

The invention relates to determining activities, e.g. dialogue, to be performed by at least one non-player character (NPC) in an interactive experience, e.g. a video game. Activities performed by an NPC are used to update established context or lore within the interactive experience, with the updated context or lore being used to determine subsequent activities by the same and/or other NPCs to be performed in the interactive experience. In this way, subsequently generated activities are consistent with the established context/lore, including any emergent lore that emerges as events occur in the interactive experience.

BACKGROUND

In interactive experiences such as video games, immersive theatre, etc., a player or user often controls a character within the experience, e.g. by inputs via a games console controller, keyboard, mouse, etc. This character may be referred to as a player character (PC). A PC may be controlled to performed different activities, e.g. utter a portion of dialogue, move within the interactive experience, perform an action, etc. Often, these activities involve interacting with other characters within the interactive experience. In particular, these may include characters not controlled by a player, but instead controlled automatically within the interactive experience. Such a character may be referred to as a non-player character (NPC). The PCs and NPCs may represent humans, aliens or any other suitable game elements.

The interactions between PCs and NPCs may be in the form of a conversation (dialogue) or may be in the form of a physical interaction, e.g. a battle, for instance. Actions/activities performed by an NPC during an interaction are generated automatically within the game. Often, an NPC's actions/activities are generated in response to the action/activity of a PC with which the NPC is interacting. However, an NPC's actions/activities may also be generated in response to other events occurring within the interactive experience, e.g. an explosion.

Generative machine learning (ML) models, such as Large Language Models (LLMs), can be used to generate activities/actions of NPCs within interactive experiences. This can improve the flexibility and depth of the interactive experience for a player, thereby providing improved immersion.

An issue that can arise with using generative models to determine NPC actions is that generated actions may be inconsistent with the existing/established context or lore within the interactive experience. The context or lore may include factors such as settings, locations, and character details such as backstory and physical capabilities, etc. The context/lore may be regarded as including established facts within the interactive experience. When an interactive experience is written, designed and produced, the lore/context typically may be created manually. This process will involve deliberate choices being made, and a level of iterative review for whether the established lore/context includes any inconsistencies.

In more traditional interactive experiences, all NPC actions, e.g. dialogue, would be determined fully prior to the interactive experience being consumed. However, with actions/dialogue generated with generative ML models such as LLMs, this is not the case. As an interaction, e.g. conversation, develops, NPCs controlled based on generative ML model output will use predefined lore/context to inform appropriate actions, e.g. lines of dialogue. However, the predefined lore/context cannot establish a priori all of the possible facts about a world/experience in which a character resides. Many topics of conversation, for instance, may need improvisation from an NPC that, in turn, establishes new facts about the world/experience. This may be referred to as emergent lore/context.

Generative ML models, such as LLMs, have been developed to become more robust at generating content, e.g. dialogue, that remains consistent with the information they are provided. The amount of information that an LLM can receive as input—referred to as the context window—continues to increase as LLM technology is further developed. For relatively small interactive experiences, such as single-conversation experiences with a relatively small established lore, the full predefined lore and interaction/conversation history—which inherently includes any emergent lore—can be provided as context to the LLM. This tends to be sufficient to keep a single interaction/conversation consistent with any predefined lore and improvised expansion of that lore performed by a character within that specific interaction/conversation.

However, retaining consistency of an interactive experience becomes challenging when extending beyond such relatively small, single-interaction/conversation experiences. This is for a couple of reasons. Firstly, the established lore/context of an interactive experience may be relatively large, and/or an interaction/conversation may go on for a relatively large amount of time, such that there is a long/large interaction/conversation history. In this case, the information to be provided as context can either: exceed the allowed size of the context window; or, it becomes large enough such that the system's capability to remain consistent within the full context degrades even if the system being used allows for the entire context to be used. The speed of inference to determine activities performed in the interactive experience also tends to reduce as the context window size increases. It is noted that almost all of the interactive experiences (e.g. video games) that enter production will be larger than the maximum size at which all of the established lore and interaction history can fit into a context window.

One way to address this issue is via a technique called Retrieval Augmented Generation (RAG). RAG establishes a store of information that may be queried, e.g. the established lore/context and interaction/conversation history. Then, during the process of generating an activity, e.g. dialogue, to be performed by an NPC the information store is queried for relevant parts to be used within the input context, rather than providing all of the established information as input. However, this RAG approach is still insufficient for larger interactive experiences.

A second reason that retaining consistency is challenging for generative interaction/dialogue experiences is that they commonly do not exist as merely a single interaction/conversation between one PC and one NPC. Indeed, this compounds with the first reason outlined above. Even with a single PC, there may be multiple interactions/conversations between this PC and one or more NPCs. Typically, an experience will be consumed by multiple people/players either: in isolation ('single player'); or simultaneously, as part of a shared world/experience with many different interactions/conversations taking place in parallel ('multiplayer'). A consistent lore is needed for use in generating all of the different interactions/conversations by all of the different NPCs with all of the different consumers.

Chinese patent publication no. CN 118079400 A discloses a system in which an LLM is used to generate reply content to be output by an NPC in response to input from a player and additional information retrieved from a 'world knowledge base' based on the player input. The reply content is parsed using a discriminator, the NPC's speech or behavioral response is determined according to the parsed result, and the world knowledge base is updated according to the NPC's speech or behavioral response. In particular, the discriminator uses a method similar to a behavior tree to make judgments, and can determine the possible verbal or behavioral responses of the NPC by analyzing whether the reply contains preset embedded words.

There is a need to provide improved approaches for ensuring that activities—e.g. dialogue, actions, etc.—of NPCs generated using generative ML models remain consistent with established context in an interactive experience/world, while also ensuring that the established context is developed in an effective manner to make the interactive experience more immersive. It is against this background to which the present invention is set.

SUMMARY

The present invention advantageously provides computer-implemented methods and systems that allow for maintaining continuity or consistency of established context/lore within an interactive experience and are used to generate/improvise activities (e.g. dialogue utterances, physical actions) performed/output by non-player characters (NPCs) within the interactive experience in a manner that expands/extends the established context/lore.

These advantages are achieved via the provision of methods/systems in which the semantic content of the output activities of the NPCs is assessed against, or compared to, the semantic content of the established context/lore within the interactive experience, and then updating the established context based on the assessment/comparison. By basing updates to established context on semantic content, more informed updates to the established context can be performed compared to, for instance, updates performed based on the presence of embedded terms/words in dialogue output by an NPC. These more informed updates contribute to making the interactive experience more immersive. The updates can take various forms, including merging, extrapolating or replacing established context data.

As mentioned above, existing Retrieval Augmented Generation (RAG) approaches that select only some of the established context/lore to be used as input for the generation of activities to be performed from NPCs are not sufficient for larger interactive experiences. This is because they do not adapt to the emergent nature of the environment/gameplay in such interactive experiences. In particular, in larger experiences, it is not possible to include all of the static and dynamic context/lore into the context window. As RAG approaches are static, then there is still a limit on how much dynamic information you can include in the context window. In contrast, the invention beneficially provides for approaches in which dynamic lore is merged into static lore to provide an updated version of the entire established lore of the interactive experience from which the most relevant information can be used in subsequent activity generation tasks. Further beneficial effects of the present invention will become apparent, and will be described, in the following.

According to an aspect of the invention there is provided a computer-implemented method for determining activities to be performed by at least one non-player character (NPC) in an interactive experience. The method comprises implementing/performing method steps at one or more computer processors.

In some embodiments, the method comprises performing an activity generation task, including: receiving input activity data indicative of an input activity occurring within an instance of the interactive experience; accessing, from a context database, a context set of entire established context data within the interactive experience, and determining, based on relevance to the activity generation task, a context subset of established context data from the context set; accessing, from an activity history database, an activity history set of entire activity history data in the instance of the interactive experience, and determining, based on relevance to the activity generation task, an activity history subset of activity history data from the activity history set; determining, using an activity model in the form of a trained generative machine learning (ML) model, output activity data indicative of an output activity to be performed by an NPC of the at least one NPC, based on the received input activity data, the context subset of established context data, and the subset of activity history data, and controlling the NPC to perform the output activity.

In some embodiments, the method comprises updating the context set of entire established context data based on the output activity data to obtain an updated context set of entire established context data. Updating the context set comprises: characterizing semantic content of the context set of entire established context data; characterizing semantic content of the output activity data; and updating the context set to obtain the updated context set based on a comparison of the semantic content of the context set and the semantic content of the output activity data.

In some embodiments, the method comprises performing a subsequent activity generation task, subsequent to the activity generation task, comprising: receiving subsequent input activity data indicative of a subsequent input activity, different from the input activity, occurring within a further instance of the interactive experience; accessing the updated context set of entire established context data, and determining, based on relevance to the subsequent activity generation task, a further context subset of established context data from the updated context set; accessing, from a further activity history database, a further set of entire activity history data in the further instance of the interactive experience, and determining, based on relevance to the subsequent activity generation task, a further subset of activity history data from the further set; determining, using a further activity model in the form of a trained generative ML model, subsequent output activity data indicative of a subsequent output activity to be performed by a further NPC of the at least one NPC, based on the received subsequent input activity data, the further context subset of established context data, and the further subset of activity history data, and controlling the further NPC to perform the determined subsequent output activity.

Typically, the input activity data is received from a player/user consuming the interactive experience, e.g. a player interacting with an input device (such as a keyboard, microphone, etc.) to cause an activity to occur within the interactive experience, e.g. a portion of dialogue being expressed (which may be via an utterance of player character), a player character performing an action, moving, etc. In some examples, the subsequent input activity may be received from the same player or a different player in the same instance or a different instance of the interactive experience, in particular to cause a subsequent activity to be performed, e.g. by the same player character, a different player character, or where the activity is not necessarily performed by a character.

In some other examples, the subsequent input activity data may not be received from a player/user consuming the interactive experience. Instead, the subsequent input activity data may be generated within the interactive experience and be indicative of an activity occurring within the interactive experience without needing player/user input. For instance, the input activity data may be received from a player/user of the interactive experience to cause an activity to occur, e.g. a portion of dialogue to be input/entered. As outlined above, the output activity to be performed by the NPC (e.g. a portion of dialogue to be uttered) is determined/generated in response to (or based on) the received input activity data. The context set is updated based on the output activity of the NPC, as outlined above. Then, the subsequent input activity data may in some cases be regarded as the output activity of the NPC (with the further instance being the same as the instance), where a subsequent output activity to be performed by the further (in this case, different) NPC is determined in response to the output activity of the NPC, but being based on the updated context set (updated based on the output activity of the NPC).

In some embodiments, updating the context set of entire established context data includes performing one or more of:

(i) discarding the output activity data without integrating it into the context set;

(ii) integrating the output activity data into the context set without modifying any of the established context data in the context set; in some embodiments, at least some of the output activity data is modified prior to it being integrated into the context set; and (iii) integrating the output activity data into the context set and modifying at least some of the established context data in the context set to remove conflicts between semantic content of the output activity data and the established context data in the context set; in some embodiments, at least some of the output activity data is modified prior to it being integrated into the context set, to obtain the updated context set.

In some embodiments, updating the context set of entire established context data includes:

categorizing the output activity data into one or more categories of a plurality of defined categories; and determining whether to perform step (i), (ii) or (iii) based on the one or more categories into which the output activity data is categorized.

In some embodiments, the plurality of defined categories includes one or more of:

an additive category for data having semantic content that is not contained in the context set;

a supportive category for data having semantic content that is included in a less specific form in the context set;

a conflicting category for data having semantic content that contradicts semantic content of established context data in the context set; and a redundant category for data having semantic content that is already included in the context set.

In some embodiments, updating the context set of entire established context data includes:

determining a value for each of one or more context metrics based on semantic content of the output activity data and the one or more categories into which the output activity data is categorized; and determining whether to perform step (i), (ii) or (iii) based on the one or more context metric values.

In some embodiments, one of the context metrics is a consistency metric indicative of a measure of consistency of semantic content of the output activity data relative to semantic content of the established context data in the context set.

In some embodiments, the one or more context metrics includes one or more of:

a player experience metric indicative of a measure of a player's experience within the interactive experience;

a direction metric indicative of a measure of to what degree semantic content of the output activity data expands a coverage of semantic content of established context data in a defined direction;

an alignment metric indicative of a measure of to what degree semantic content of the output activity data is aligned with semantic content of originally established context data; and a quality metric indicative of a measure of quality of semantic content being added by the output activity data.

In some embodiments, updating the context set includes executing a context model in the form of a trained generative ML model to compare the semantic content of the context set and the semantic content of the output activity data. An output of the context model may comprise an instruction for how to update the context set to obtain the updated context set.

In some embodiments, characterizing semantic content of the output activity data includes obtaining at least one semantic vector representing the output activity data. In some embodiments, the at least one semantic vector is configured to be received as input into the context model.

In some embodiments, characterizing semantic content of the context set of entire established context data includes obtaining at least one semantic vector representing at least some of the context set of entire established context data. In some embodiments, the at least one semantic vector is configured to be received as input into the context model.

In some embodiments, updating the context set includes:

characterizing semantic content of the input activity data; and updating the context set to obtain the updated context set based on a comparison of the semantic content of the context set and the semantic content of the input activity data.

In some embodiments, the further NPC is the same as the NPC.

In some embodiments, the context database is a global context database stored at a location remote from the one or more processors and accessible by the one or more processors via a network. In some embodiments, the remote location is a Cloud-based server location.

In some embodiments, the activity generation task is implemented by one or more processors of the one or more processors.

In some embodiments, the method comprises performing a second activity generation task, implemented by a second one or more processors of the one or more processors. In some embodiments, the second activity generation task includes: receiving second input activity data indicative of a second input activity occurring within a second instance of the interactive experience; accessing, from a second context database, a second context set of entire established context data within the interactive experience, and determining, based on relevance to the second activity generation task, a second context subset of established context data from the second context set; accessing, from a second activity history database, a second activity history set of entire activity history data in the second instance of the interactive experience, and determining, based on relevance to the second activity generation task, a second activity history subset of activity history data from the second activity history set; and determining, using a second activity model in the form of a trained generative ML model, second output activity data indicative of a second output activity to be performed by the NPC, based on the received second input activity data, the second context subset of established context data, and the second activity history subset of activity history data, and controlling the NPC to perform the second output activity.

In some embodiments, the method comprises updating the second context set of entire established context data based on the second output activity data to obtain a second updated context set of entire established context data. In some embodiments, updating the second context set comprises: characterizing semantic content of the second context set of entire established context data; characterizing semantic content of the second output activity data; and updating the second context set to obtain the second updated context set based on a comparison of the semantic content of the second context set and the semantic content of the second output activity data.

In some embodiments, the second context set is the same as the context set. In some embodiments, the second context database is the same as the context database. In some embodiments, the context database is a global context database stored at a location remote from the one or more processors and accessible by the one or more processors via a network. In some embodiments, the remote location is a Cloud-based server location.

In some embodiments, the method comprises receiving the output activity data and the second output activity data at an update module for updating the context set. In some embodiments, the context set is updated based on an order in which the output activity data and the second output activity data is received at the update module.

In some embodiments, the second context database is different from the context database. In some embodiments, the context database is an instance context database of entire established context data within the instance of the interactive experience. In some embodiments, the second context database is a second instance context database of entire established context data within the second instance of the interactive experience. In some embodiments, the method comprises receiving the output activity data and the second output activity data at an update module for updating a central context set of entire established context data stored in a global context database at a location remote from the one or more processors and accessible by the one or more processors via a network. In some embodiments, the context set is updated based on the order in which the output activity data and the second output activity data is received at the update module.

In some embodiments, the method comprises updating the context set and the second context set stored at the instance context database and the second instance context database, respectively, based on an indication of updates to the context set from the global context database via the network. In some embodiments, the indication of updates are received periodically.

In some embodiments, the method comprises updating the central context set stored at the global context database based on an indication of updates, received via the network, to the context set stored at the instance context database and/or the second context set stored at the second instance context database.

In some embodiments, the method comprises updating the activity history set of entire activity history data to include the input activity.

In some embodiments, the context database is an instance context database of entire established context data within the instance of the interactive experience. In some embodiments, updating the context set includes updating the context set stored at the instance context database.

In some embodiments, the method comprises, at the one or more processors: transmitting, via the network, updates to the context set stored at the instance context database to a central server. At the central server, the method includes: receiving the updates to the context set; updating a global context set, stored at a global context database, of established context data within the interactive experience based on the received updates; and transmitting, via the network, updates to the global context set stored at the global context database for updating the context set stored at the instance context database.

In some embodiments, the input activity includes one or more of: a portion of dialogue being uttered, or an action being performed, by a player character (PC) of one or more PCs in the instance of the interactive experience; a portion of dialogue being uttered, or an action being performed, by an NPC of the one or more NPCs in the instance of the interactive experience; or an event occurring in the instance of the interactive experience.

In some embodiments, determining the context subset of established context data from the context set includes selecting an amount of established context data, from the context set to be included in the context subset, that is no greater than a defined size of a context window to be used as input to the trained generative ML model. In some embodiments, the defined size is a defined number of tokens.

In some embodiments, determining, based on relevance to the activity generation task, the context subset of established context data from the context set includes: obtaining a plurality of context semantic vectors representing the established context data in context set, where each context semantic vector of the plurality of context semantic vectors represents a portion of the established context data (in some embodiments, each portion is a document, a paragraph, a sentence, a phrase, or a word or part of a word in the established context data); obtaining at least one input semantic vector representing the received input activity data; determining a value of a semantic similarity metric between the at least one input semantic vector and each of the respective context similarity vectors, indicative of relevance of the respective portion of the established context data to the activity generation task; and selecting one or more portions of the established context data for inclusion in the context subset based on the determined semantic similarity metric values associated with the respective portions of established context data in the context set.

In some embodiments, selecting one or more portions of the established context data includes: ordering in a list, from highest value to lowest value, the portions of established context data in the context set according to the associated semantic similarity metric values; and selecting a defined number of the top portions of established context data in the list.

The some embodiments, the activities to be performed by the at least one NPC include one or more of: uttering a portion of dialogue; performing a physical action; and performing an animation.

In some embodiments, the interactive experience is a video game experience.

In some embodiments, there is provided a system for controlling at least one non-player character (NPC) in an interactive experience to perform activities within the interactive experience. The system comprises one or more computer processors.

In some embodiments, the system is configured to perform an activity generation task, comprising the one or more processors being configured to:

- receive input activity data indicative of an input activity occurring within the interactive experience;
- access, from a context database, a context set of entire established context data within the interactive experience, and determine, based on relevance to the activity generation task, a context subset of established context data from the context set;
- access, from an activity history database, an activity history set of entire activity history data in an instance of the interactive experience, and determine, based on relevance to the activity generation task, an activity history subset of activity history data from the activity history set; and
- determine, using an activity model in the form of a trained generative machine learning (ML) model, output activity data indicative of an output activity to be performed by the NPC, based on the received input activity data, the context subset of established context data, and the subset of activity history data, and control the NPC to perform the output activity.

In some embodiments, the system is configured to update the context set of entire established context data based on the output activity data to obtain an updated context set of entire established context data. To update the context set, the one or more processors are configured to:

- characterize semantic content of the context set of entire established context data;
- characterize semantic content of the output activity data; and
- update the context set to obtain the updated context set based on a comparison of the semantic content of the context set and the semantic content of the output activity data.

In some embodiments, the system is configured to perform a subsequent activity generation task, subsequent to the activity generation task, comprising the one or more processors being configured to:

- receive subsequent input activity data indicative of a subsequent input activity occurring within the interactive experience;
- access the updated context set of entire established context data, and determine, based on relevance to the subsequent activity generation task, a further context subset of established context data from the updated context set;
- access, from a further activity history database, a further set of entire activity history data in a further instance of the interactive experience, and determine, based on relevance to the subsequent activity generation task, a further subset of activity history data from the further set; and
- determine, using a further activity model in the form of a trained generative ML model, subsequent output activity data indicative of a subsequent output activity to be performed by the further NPC, based on the received subsequent input activity data, the further context subset of established context data, and the further subset of activity history data, and control the further NPC to perform the determined subsequent output activity.

In some embodiments, there is provided a method of updating a context database storing a context set of entire established context data within an interactive experience. The method comprises implementing/performing method steps at one or more computer processors.

In some embodiments, the method comprises: receiving output activity data indicative of an output activity to be performed by a non-player character (NPC), of one or more NPCs, in an instance of the interactive experience, or receiving input activity data indicative of an input activity to be performed by a player character (PC) in the instance of the interactive experience; receiving second output activity data indicative of a second output activity to be performed by a second NPC, of the one or more NPCs, in a second instance of the interactive experience (which may be the same as, or different from, the instance), or receiving second input activity data indicative of a second input activity to be performed by a second PC in the second instance of the interactive experience; identifying that the output activity data or input activity data is received prior to the second output activity data or second input activity data; performing an update task, including: characterizing semantic content of the context set of entire established context data; characterizing semantic content of the received output activity data or input activity data; and updating the context set to obtain the updated context set based on a comparison of the semantic content of the context set and the semantic content of the output activity data or input activity data. The method also includes: performing a subsequent update task, which includes: characterizing semantic content of the updated context set of entire established context data; characterizing semantic content of the received second output activity data or second input activity data; and updating the updated context set to obtain a further updated context set based on a comparison of the semantic content of the updated context set and the semantic content of the second output activity data or second input activity data. The further updated context set is provided for use in determining subsequent output activity data indicative of activities to be performed by at least one of the one or more NPCs in the instance or the second instance of the interactive experience.

BRIEF DESCRIPTION OF THE DRAWINGS

Examples of the invention will now be described with reference to the accompanying figures, in which.

DETAILED DESCRIPTION

Figure 1:
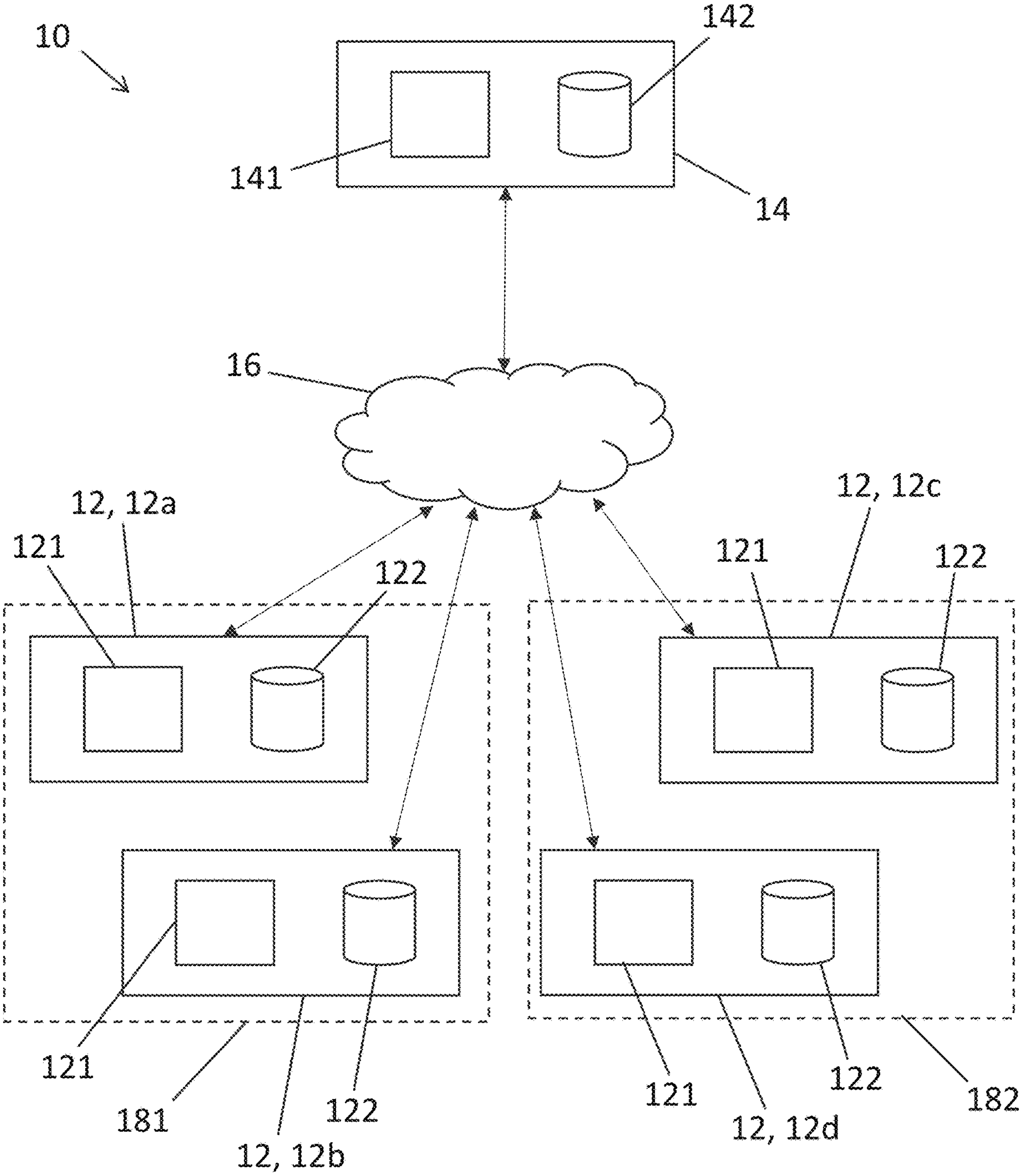
FIG. 1 shows a system for implementing an interactive experience in accordance with examples of the invention.

The present invention provides computer-implemented methods and systems for determining activities to be performed by at least one non-player character in an interactive experience. The activities may be performed as part of interactions between at least one player character in the interactive experience and the at least one non-player character, or in view of events occurring within the interactive experience, for instance.

The interactive experience may take any suitable form, such as a video game, interactive theatre production, etc. In examples described herein, a video game experience is described; however, it will be understood that this is not limiting.

The interactive experience may be implemented on one or more computer devices each including one or more computer processors and/or one or more memory devices. The memory devices may store one or more databases, including data relating to the interactive experiences and/or instructions to be executed by the computer processor(s) to perform methods associated with the interactive experience.

The computer device(s) implementing the interactive experience may include one or more input devices configured to receive input commands/signals, such as from players/users of the interactive experience. The input devices may include one or more of a video game controller, a computer keyboard, a computer mouse, a touch-sensitive computer screen/monitor, a microphone, a movement/gesture sensor, etc.

The computer device(s) implementing the interactive experience may include one or more output devices configured to output activities or events occurring within the interactive experience, such as dialogue uttered by, or actions performed by, characters in the interactive experience. The output devices may include one or more of a computer screen/monitor, an acoustic speaker, a haptic feedback device, etc.

The computer devices implementing the interactive experience may include one or more local computer devices and/or one or more central computer devices or servers connected via a network, e.g. a wireless network such as the Internet. A central server may be stored in the Cloud.

Characters, objects, etc. within the interactive experience may be represented in any suitable manner, e.g. visually on a computer screen and/or audibly via one or more speakers. For instance, some of the characters may be represented as humans, aliens, etc.

Characters in the interactive experience may be capable of performing various activities. These activities may include uttering portions of dialogue or performing physical actions, such as moving (walking, running, climbing, etc.) within an environment of the interactive experience, engaging in a battle with other characters, picking up and using objects, combining items, etc.

Characters in the interactive experience may interact with one another (as well as with other objects, e.g. a wall to be scaled). The interactions may take different forms. For instance, an interaction may include a conversation between two or more characters, with one character outputting a portion of dialogue to/towards one or more other characters, and then with the one or more other characters outputting another portion of dialogue in response. In another example, an interaction may involve characters performing different physical actions towards one another, e.g. during a battle.

Characters in the interactive experience may witness events occurring within the experience environment that may be caused, directly or indirectly, by the actions of another character, or by events unrelated to other characters, e.g. an explosion, a change in weather, etc. Characters may be controlled to perform one or more activities in response to such events.

A player character (PC) within the interactive experience is a character that is controlled by a player or user of/consuming the interactive experience. For instance, the player may input commands via the input device(s), e.g. video game controller, that are then processed by the processor(s) and used to control the PC (being controlled by the player) to perform various activities, e.g. utter a portion of dialogue.

A non-player character (NPC) within the interactive experience is a character that is controlled to perform activities automatically, specifically as determined by the processor(s) implementing the interactive experience.

Interactions between characters may be between different PCs, PCs and NPCs, and/or different NPCs.

The interactive experience includes a set of established context/lore data indicative of entire established context or lore within the interactive experience. In particular, this can include all of the established facts within the interactive experience. For instance, this may include settings, locations, and character details such as backstory and physical capabilities, etc. An initial set/portion of established context/lore is typically predefined within the interactive experience. The established context/lore is then updated based on events, activities, etc., that occur within the interactive experience over time. This updating process will be described in greater detail below.

The interactive experience may include a plurality of different instances each being consumed by different players. Each instance may be consumed/used/played by one or more players. Each instance may be implemented by one or more computer devices or processors different from computer devices/processors implementing other instances. Each instance may be implemented on one or more local computer devices and/or may be hosted at a central server.

Each instance is a replication of the interactive experience, with each instance being able to handle/support a defined/limited number of players consuming the respective instance. By scaling the number of instances of the interactive experience that are implemented, the number of players consuming the interactive experience can scale (with the number of instances, e.g. infinitely).

Typically, actions taken by a player within one instance will be replicated/viewable within the computing/client devices of other players with said instance, but will not be perceived by players consuming a different instance of the interactive experience.

The set of entire/complete established context (the 'context set') is stored in a context database. The context database may be stored centrally or locally. In one example in which there are a plurality of instances of the interactive experience, a global context set including entire established context/lore may be stored centrally, e.g. at a Cloud-based server, and each instance of the interactive experience may store a local context set, in a respective local context database, that is a local version of the entire established context. Updates to the global context set, stored in the global context database, may be passed, e.g. via the wireless network, to the or each local context database so that they can be incorporated into the local versions of the context set. Updates to one or more of the local context sets may be passed, via the network, to the global context database, and a determination may be made whether to incorporate the updates into the global context set. Examples of this will be described in greater detail below.

Each instance of the one or more instances of the interactive experience includes a set of all of the activities that have occurred in the respective instance of the interactive experience. The activities include activities performed by characters, such as dialogue utterances, actions, etc. (including activities performed during interactions with other characters as well as activities performed in isolation, or separate, from other characters) as well as activities/events that occur without character intent, e.g. explosions, changes in weather, etc. This activity history set is stored in an activity history database associated with the respective instance of the interactive experience, and may typically be stored locally. The activity history set is updated to include (new) activities as they occur or are performed within the instance of the interactive experience.

The methods and systems of examples of the present invention perform activity generation tasks to generate/determine activities to be performed by one or more NPCs, and controlling the NPCs to perform these activities. The activity generation tasks may involve generating activities to be performed by an NPC in response to an activity performed by a PC during an interaction between the PC and NPC. More generally, the activity generation tasks to generate activities to be performed by an NPC in response may be performed in response to any suitable trigger within the interactive experience, e.g. an event (such as an explosion) occurring.

The activity to be performed by an NPC is generated/determined using a trained generative machine learning (ML)/artificial intelligence (AI) model. In examples of the invention, the trained ML model—or activity model—may typically be a Large Language Model (LLM). However, different types of generative ML model may be used, such as variational autoencoders, generative adversarial networks (GANs), autoregressive models, recurrent neural networks (RNNs), etc.

The LLM that may be used as the activity model may for instance be available via a Cloud provider, such as one or more trained models from Open AI's GPT4-series, Anthropic Claude 3.5, or Llama3 405B on Grok. Alternatively, the LLM may be a model that is implemented locally, such as NVIDIA Nemo Minitron 8B or Llama 3.2 3B. In either case, some embodiments use training data to fine-tune the model to increase its effectiveness when performing the specific tasks described in this disclosure.

The activity model in examples described herein is configured to generate an output indicative of an activity to be performed by an NPC. The model output is generated based on various input data received at an input of the activity model. Typically, the input data includes established context/lore within the interactive experience, activity history within (the instance of) the interactive experience and an input activity occurring within the interactive experience. For instance, when the activity generation task occurs during an interaction involving the NPC the input activity may be performed by a PC (as controlled by a player/user).

As explained above, it is understood that an amount of data that can be included as input into a generative ML model such as an LLM is limited. The amount of input data that is permitted is typically defined by the (fixed) size of a so-called context window associated with the ML model. The context window size typically defines/specifies a number of tokens that can be received as input by the ML model. In an example in which the inputs are in the form of natural language, for instance (e.g. when the interaction between characters is a conversation), each token typically represents some or all of a word or phrase. An illustrative example of a typical context window size is 8192 tokens; however, it will be understood that any suitable context window size may be used.

The established context set of entire established context/lore data within the interactive experience will often be larger than the context window size of the activity model. Indeed, as an interactive experience develops such that the amount of established lore increases, a difference between the amount of established lore data and the size of the context window will increase. In some examples, the established lore may expand to be at least one order of magnitude—and typically at least two orders of magnitude—larger than the context window size of the activity model. Similarly, the activity history set of entire history activity data in the instance of the interactive experience will likely be larger than—and often significantly larger than—the context window size of the activity model.

In order to ensure that the established context/lore, the activity history within the interactive experience, and the input activity(ies) are taken into account when generating an output activity to be performed by an NPC, the amount of data selected from these various data sources to be used as input to the activity model may typically need to be a subset of the total amount of data from one or more of the sources to ensure that the input does not exceed the context window size. As described above, a Retrieval Augmented Generation (RAG) technique may be used for this purpose. In particular, the RAG technique determines which parts of the entire established lore and/or activity history are (most) relevant to the particular activity generation task at hand (e.g. as defined by the input activity occurring in the interactive experience), and includes only the determined relevant parts as part of the model input.

Herein, 'relevance' may be regarded as being with reference to a measure of semantic content of the established context/lore data and activity history data relative to the semantic content of the input activity. In some examples, and in accordance with techniques known in the art, semantic vectors may be created, based on the data from various data sources, that store an indication of semantic content of the relevant data. A semantic vector is typically a high-dimensional vector in which the semantic content of data, such as natural language data, is represented as a point in high-dimensional vector space.

A measure of similarity between two or more semantic vectors may be performed using similarity metrics known in the art, e.g. a distance metric such as a cosine similarity metric. In some examples, the more similar (less far apart), according to the similarity metric, a semantic vector representing a portion of established context data or activity history data is to the semantic vector representing the input data is, the more relevant the respective portion of established context data or activity history data is deemed to be.

In one example, parts of the established context data may be summarized and the summaries embedded within vectors. The vectors can be used to find/identify the summaries, with the summary or full content of the context that was summarized being returned when queried.

The input to the activity model will then comprise the input activity (e.g. input dialogue from a player character), a subset of the most relevant established context data, and a subset of the most relevant activity history.

As mentioned above, the output generated/determined by the activity model is indicative of an activity to be performed by the relevant NPC. Within the interactive experience, the NPC is controlled automatically to perform/undertake the generated activity. The generated activity may establish new facts/lore about the interactive world/experience. For instance, in an example in which the generated activity is dialogue uttered by the NPC, the NPC may reveal in the generated activity facts about their backstory that are not currently part of the established lore (e.g. the name of a lecturer they had at university). In another example in which the generated activity is an action performed by the NPC, the action may imply certain facts about the interactive world/experience that are not currently part of the established lore (e.g. if the NPC draws a sword then it is implied that the NPC was carrying a sword).

To ensure that activities, performed by an NPC, as generated by a generative ML model ('emergent lore/context') are consistent with the established context/lore of the interactive experience, and to ensure that subsequently-generated actions by the NPC or other NPCs in the interactive experience are consistent with the emergent context/lore, the present invention provides for updating/expanding the established context/lore using the emergent context/lore. In particular, this updating does not involve merely adding 'raw' output activity data generated by the activity model to the established context. Instead, the invention provides techniques for determining if and how emergent context/lore is merged or integrated into the set of (current) entire established context in order to obtain an updated set of entire established context/lore available to be accessed for use in a subsequent activity generation task for one or more NPCs.

The merging/integration may involve modification of the generated output activity data for incorporation into the established context set. The merging/integration may involve modification of established context already in the established context set. The modification could take the form of one or more of: deletion of a portion of output activity and/or established context data, e.g. where conflicts between data arise; and extrapolation of a portion of output activity and/or established context data to establish more general facts about the interactive experience (e.g. an implied fact that an NPC is carrying a sword, as in the example mentioned above).

The determination as to if and how emergent context/lore is integrated into the context set of entire established context is performed with reference to the semantic content of the emergent context and entire established context and, in particular, based on a comparison thereof.

The semantic content-based comparison may include performing various processing tasks, either discretely or in combination as part of a single process. One such processing task may be a categorization task. In some examples, this may include categorizing the emergent context data into one or more of: an additive category; a supportive category; a conflicting category; and a redundant category.

The emergent context/lore—e.g., the new piece of information—may be categorized as additive if the established context/lore data in the context set does not contain anything about the emergent context. The emergent context may be categorized as supportive if the established context includes context that is less specific than the emergent context. The emergent context may be categorized as conflicting if the established context includes context that contradicts the emergent context. The emergent context may be categorized as redundant if it is already included in the established context. For instance, the categorization of emergent lore/context into one of the categories may be performed by an LLM.

Another processing task that may be performed as part of the semantic content-based comparison is an evaluation task. This may involve determining the value—according to some defined metric—that would be obtained from merging/integrating a specific piece of emergent context into the set of entire established context, i.e. a measure of how useful or worthwhile it would be to integrate the emergent context into the context set. It may be that only emergent data deemed to be of at least a certain/minimum level of value/usefulness—according to the defined metric—is integrated into the context set. This value/usefulness determination is typically with reference to not only the emergent context data itself, but also the category to which it has been assigned.

A defined metric value indicative of overall value of merging the emergent context into the entire established context may include a combination of values from one or more different evaluation metrics each for valuing a particular characteristic or aspect of the emergent context. One such evaluation metric may be a consistency metric that is indicative of how consistent a piece of emergent context is with the entire established context. For instance, a piece of emergent context that is categorized as additive, but not conflicting, may be assigned a relative high consistency metric value.

Further metrics that may be considered as part of an overall evaluation of the usefulness of a piece of emergent context include: a player experience metric that indicates to what extent the emergent context adds to the overall experience of a player within the interactive experience; a coverage metric which indicates to what extent emergent context expands coverage of the established context in a desired direction; an alignment metric which indicates how aligned emergent lore is with an original vision of the interactive experience as defined by writers, etc.; and a quality metric which indicates a quality of the storytelling associated with emergent context.

A further processing task that may be performed as part of the semantic content-based comparison is an integration task. In some examples, this may perform a determination, based on the results from the evaluation task, as to how to integrate emergent context into the context set. If the value/usefulness metric is relatively low, then the determination may be to not integrate the emergent context into the context set.

Another possible determination may be to simply integrate/add the emergent context into the context set without any modification to established context already in the context set. In some embodiments, the emergent context may be modified prior to being integrated/added to the context set. For instance, a plurality of established facts in the established context may indicate that a character attended university in a certain decade, e.g. 2030s, but another specific fact means that they cannot have attended university in a specific year within that decade, e.g. 2033. Then generated dialogue indicating that the character attended university in 2033 may be modified to indicate that they attended university in a different year within the 2030s, e.g. 2034.

A further possible determination may be to integrate/add the emergent context into the context set while also performing some modification of the established context data in the context set. Again, the emergent context may also be modified prior to being integrated/added to the (modified) context set. Modification may occur when conflicts occur between emergent and established context.

In a corresponding manner to as described above in relation to activity generation, one or more semantic vectors may be created that store an indication of semantic content of the established context/lore data in the context set. Similarly, one or more semantic vectors may be created to represent the semantic content included in the emergent lore/context. The processing tasks described above may be performed based on these semantic vectors.

A probabilistic or deterministic model—referred to herein as a 'context model'—may in some examples be used to determine if and how emergent context/lore is incorporated into the context set of entire established context/lore. The context model may be a trained generative ML model, e.g. LLM. In such examples, the established context data and emergent context (e.g. output activity) data are received as input into the context model and the context model provides an output indicating how to update the context set to incorporate/merge the emergent context. If for instance the context model is implemented in the Cloud then a sufficiently large context window may be used that fits the entire established context. Alternatively, a determination of the most relevant established context is performed as above, with this most relevant established context data and emergent context being provided as input. The LLM that may be used here may for instance be available via a Cloud provider, such as one or more trained models from Open AI's GPT4-series, Anthropic Claude 3.5, or Llama3 405B on Grok. Alternatively, the LLM may be a model that is implemented locally, such as NVIDIA Nemo Minitron 8B or Llama 3.2 3B. The context model or context models may be configured to inherently/implicitly perform one or more of the categorization, evaluation and integration tasks described above in combination as part of a single process. The context model(s) may be a different type of ML model. Alternatively, the context model may in some examples be a rules-based model or logic-based model. In one example, separate models may be used to perform each of the categorization, evaluation and integration steps.

In the above, it is described how emergent context in the form of generated output activity of an NPC within the interactive experience is integrated/merged into the context set of entire established context. However, it is noted that emergent context may arise from other sources (i.e. other than NPCs) within the interactive experience. A corresponding analysis of how to integrate/merge emergent context from these other sources may also be performed. For instance, an activity in the form of an event occurring within the interactive experience, e.g. an explosion, weather change, is emergent context that may be analyzed as above to determine if and how to integrate it into the context set. Also, an activity performed by a PC—as controlled/initiated by a player/user—is emergent context that may be analyzed as above to determine if and how to integrate it into the context set.

All of the activities that occur within (an instance of) the interactive experience are included in the activity history set described above. In some examples, the determination of how to integrate emergent context into the context set is performed with reference to activity data in the activity history set that is identified as not having yet been considered for integration into the context set. In this way, activity data generated from various sources is considered.

Once the context set has been updated based on the processing tasks above—which may be based on the output of the context model—then it is the updated context set that is accessed during subsequent activity generation tasks for generating activities to be performed by one or more of the NPCs within the interactive experience. In this way, generation of subsequent activities by NPCs are generated in a manner that takes into account all of the activities that have occurred in the interactive experience, which helps to ensure that subsequently generated activities are consistent with all of the established context/lore (which includes recently occurring activities).

An illustrative example is now described. In the described example, the activity generated by an NPC by the activity model is to utter a portion of dialogue. In the described example, the generated dialogue reads: "Titus wanted me to find that document, Detective. It wasn't some careless mistake—he left it there on purpose. When I confronted him, he looked at me like he'd been waiting for that moment, as if he'd rehearsed his confession."

A comparison of the semantic content of the above output dialogue against the semantic content of the established context data reveals that the following segment of the output dialogue is not contained within the established context: "When I confronted him, he looked at me like he'd been waiting for that moment."

This segment is therefore extracted and categorized into an additive category. The extracted segment is then merged into the context set of existing/established context/lore based on a comparison of semantic content of the extracted segment and the existing established lore.

It is determined that there is the following segment of established lore: "Lucia finds a suspicious document in Titus'briefcase."

It is therefore determined that the extracted segment (emergent lore) is to be integrated into the established lore by modifying this piece of established lore as follows: "Titus deliberately leaves out a suspicious document in his briefcase, which Lucia stumbles across as he had planned."

It is determined that there is the following further segment of established lore: "Titus is surprised to see Lucia burst into his office."

It is therefore determined that the extracted segment (emergent lore) is to be integrated into the established lore by modifying this piece of established lore as follows: "Titus looks as if he had been waiting for Lucia to burst into his office."

FIG. 1 schematically illustrates an arrangement/system 10 for implementing an interactive experience described above, e.g. a video game. The system 10 includes one or more local computing devices 12, such as a laptop, personal computer, video game console, smartphone or similar. Each local computing device 12 includes one or more computer processors 121 and a local memory/storage device 122. The system 10 further includes a central server device 14 which may include one or more central processors 141 and a central memory/storage device 142. The computing devices 12, 14 are connected over a (wireless) network 16, e.g. a wide-area network (the Internet). The central server device 14 may be stored at a Cloud-based location.

In some embodiments, different instances of the interactive experience are implemented in parallel. For instance, one or more of the local devices 12*a*, 12*b* may implement one instance 181 of the interactive experience while another one or more of the local devices 12*c*, 12*d* may implement a different instance 182 of the interactive experience. Multiple local devices implementing the same instance may or may not be connected over a local area network.

Example architectures or use cases of an interactive experience will now be described, where in each case the interactive experience is implemented by a system having one or more of the components of the system 10 in FIG. 1. The interactive experience in the examples described herein is in the form of a video game.

Figure 2:
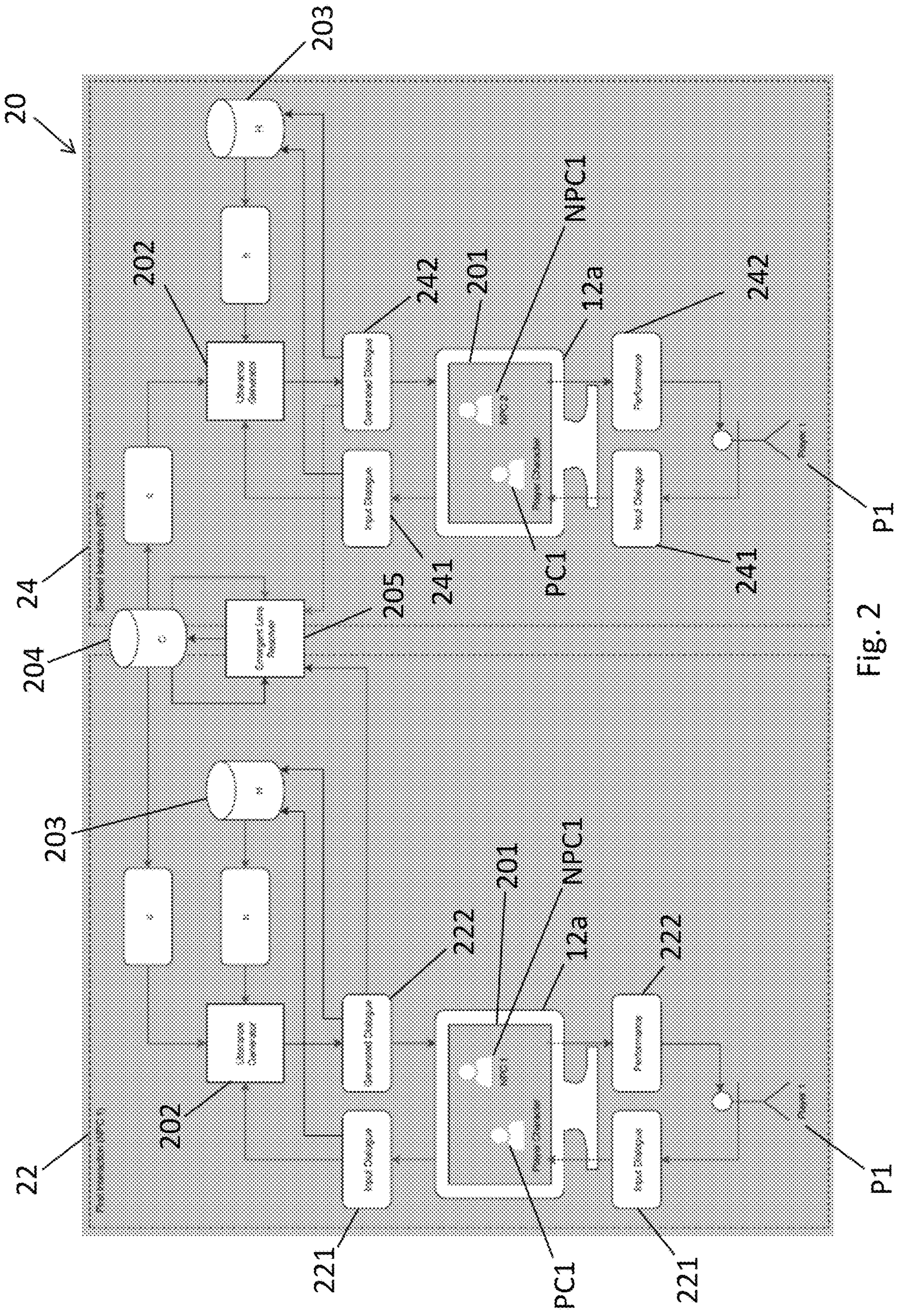
FIGS. 2-7 show example architectures of the interactive experience, implemented on the system of FIG. 1, in accordance with examples of the invention.

FIG. 2 schematically illustrates an interactive experience architecture 20 in accordance with examples of the invention. The architecture 20 illustrates a single player/user P1 consuming the interactive experience on a computing device 12*a*, e.g. a video game console. The computing device 12*a* includes a display 201 that provides a visual representation of the interactive experience/world, i.e. the game environment in the described example. The experience includes a plurality of characters and other objects, e.g. buildings, etc. that are displayed via the display to the player P1.

The player P1 controls a player character PC1 in the interactive experience by inputting commands via a suitable input device, e.g. video game console controller, keyboard, microphone, etc., of the computing device 12*a*. In particular, the player P1 controls the player character PC1 to engage in multiple interactions 22, 24 within the interactive experience, e.g. interactions in the form of conversations with non-player characters.

In the described example, the player character PC1 engages in an (initial) interaction 22 between the player character PC1 and a non-player character NPC1 in the interactive experience. The player P1 provides input in the form of input dialogue 221 for the player character PC1 to utter. The dialogue uttered by the player character PC1 may be represented in any suitable manner via the computing device 12*a*, e.g. as text on the display 201 or as audio via a speaker of the computing device 12*a*. In different examples, the player character PC1 may be controlled to perform different or additional activities, e.g. a physical action.

In response to the player character PC1 uttering dialogue towards/at the non-player character NPC1, response dialogue (and/or another activity) to be uttered/performed by the non-player character NPC1 is generated automatically and output by the computing device 12*a*, e.g. via the display 201 or a speaker, to the player P1 as an output performance/activity/dialogue 222. This may be referred to as a dialogue/activity generation task 22.

The dialogue to be uttered by the non-player character NPC1 is generated/determined by an utterance/activity generator module 202 implemented by the processor(s) 121 of the computing device 12*a*. The utterance generator module 202 uses a trained generative ML model—'activity model'—as described above to generate the dialogue to be output by the non-player character NPC1. In particular, the activity model generates as output an indication of a portion of dialogue to be uttered by the non-player character NPC1 based on an input including established context/lore of the interactive experience, an activity history within the interactive experience, and the input dialogue 221 uttered by the player character PC1.

The entire activity history of activities that have occurred or been performed within the interactive experience is stored as activity history data in an activity history set H1 stored in an activity history database 203. The activity history includes activities performed by both player and non-player characters—such as dialogue utterances, physical actions, etc.—as well as other activities/events that have occurred within the interactive experience, e.g. explosions. The activity history database 203 is stored locally. In the described example, the activity history database 203 is stored in the memory device 122 of the computing device 12*a*.

The entire established context or lore within the interactive experience is stored as entire established context data in a context set C1 stored in a context database 204. As described above, the context set includes all of the established facts within the interactive experience or game environment. The context database 204 may be stored locally, e.g. in the memory device 122 of the computing device 12*a*, or it may be stored centrally, e.g. in the central memory device 142 of the central server device 14.

As described above, in order that the amount of data provided at an input layer of the activity model of the utterance/activity generator module 202 does not exceed a defined context window size, respective subsets of the context and activity history sets are selected/determined to be used as part of the input. In particular, a context subset c1 of the most relevant established context data to the dialogue/activity generation task at hand is determined from the context set C1. Similarly, an activity history subset h1 of the most relevant activity history data to the dialogue/activity generation task at hand is determined from the activity history set H1. The determination as to which data is most relevant is performed as described above.

In addition to the generated dialogue/activity 222 output by the utterance generator module 202 being delivered by the non-player character NPC1 to the player P1, e.g. via the display 201, the generated dialogue 222 is added to the activity history to thereby update the activity history set H1 stored in the database 203. Also, the input dialogue 221 provided by the player P1 will have been added to the activity history upon receipt thereof as an update to the activity history set H1.

In accordance with examples of the invention, the generated dialogue/activity 222 output by the utterance generator module 202 is provided to an emergent lore/context resolver module 205 (or update module). The resolver module 205 may be implemented locally, e.g. in the computing device 12*a*, or it may be implemented centrally, e.g. in the central server device 14. The resolver module 205 may be located/implemented at a same location as the context database 204.

The resolver module 205 is configured to determine if and how the generated dialogue ('emergent lore') is integrated/merged into the context set C1 to thereby obtain an updated version of the context set C1. This is performed as described above, i.e. based on a comparison of the semantic content of the emergent lore and the semantic content of the established lore. For instance, this may be performed using one or more trained (generative or non-generative) ML models or deterministic models ('context model(s)') that may perform categorization, evaluation and/or integration steps (explicitly or implicitly).

In the described example, the player character P1 engages in a subsequent interaction 24 with a non-player character NPC2 in the interactive experience. It is noted that the non-player character NPC2 may be the same as or different from the non-player character NPC1. The subsequent interaction occurs after the (initial) interaction described above. The subsequent interaction also occurs after the context set C1 has been updated based on the emergent context/lore from the previous (initial) interaction.

In a corresponding manner to as described above for the initial interaction 22, the subsequent interaction 24 involves, or is triggered by, the player P1 controlling the player character P1 to utter a portion of dialogue 241. The utterance generator module 202 is configured to receive the input dialogue 241. The utterance generator module 202 is also configured to receive respective subsets c1, h1 of the (updated) context set C1 and (updated) activity history set H1, including the most relevant parts of the established context and activity history to the generation task at hand (i.e. based on the input dialogue 241), determined as described above.

The utterance generator module 202 determines an output indicative of generated dialogue 242 to be uttered by the non-player character NPC2 in response to the player character P1. In particular, the output is determined based on the input dialogue 241, the context subset c1 and the activity history subset h1. As the established context in the context set C1 has been updated to take into account the semantic content of the previous interaction/conversation 22 then the generated dialogue 242 of the subsequent interaction/conversation 24 will remain consistent with the established lore.

Figure 3:
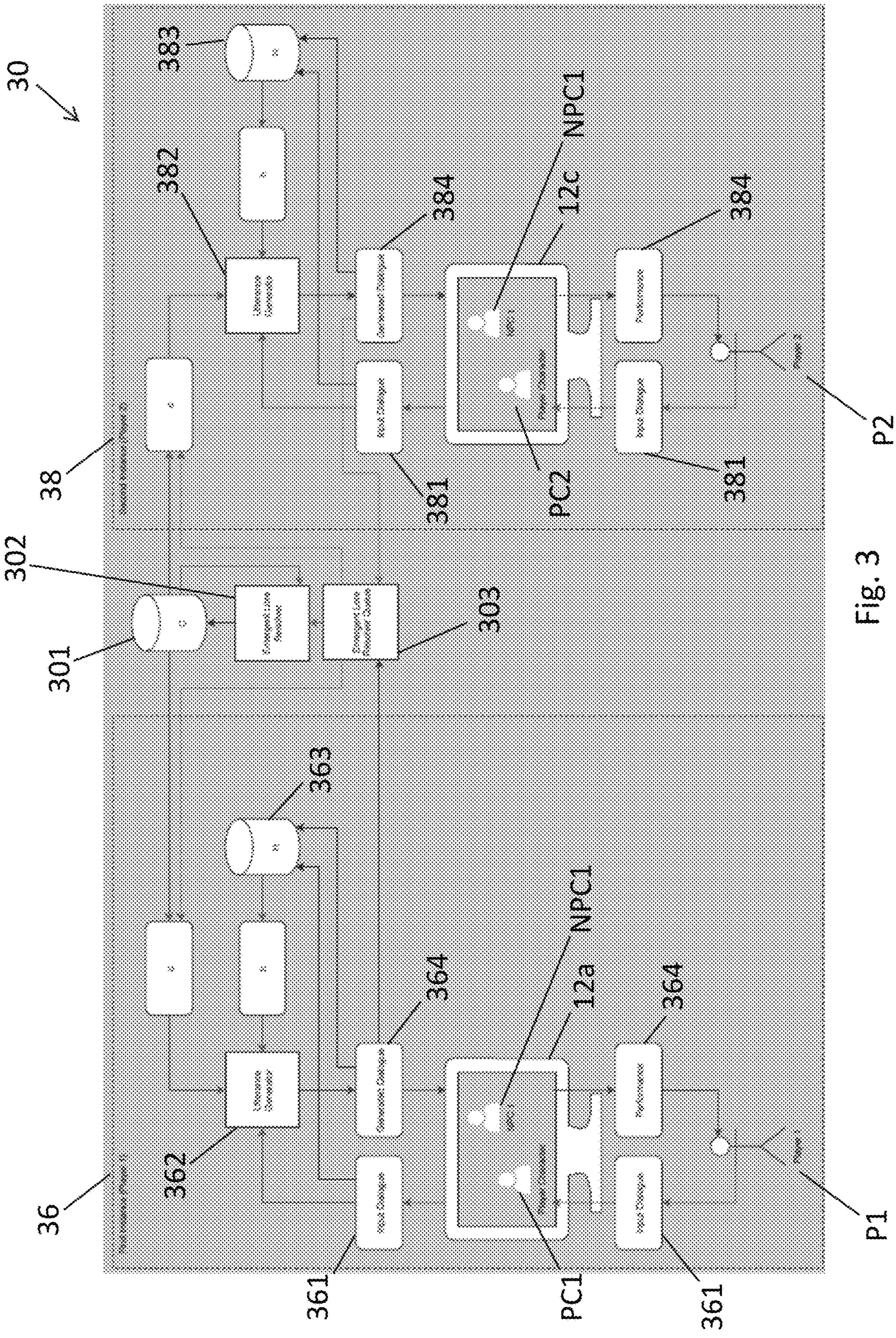

FIG. 3 schematically illustrates an interactive experience architecture 30 in accordance with examples of the invention. Like in the example illustrated in FIG. 2, in FIG. 3 a player P1 controls a player character PC1 within the interactive experience to interact with a non-player character NPC1.

In FIG. 3, the player P1 is consuming a first instance 36 of the interactive experience implemented on the computing device 12*a*. In FIG. 3, a second player P2—different from the first player P1—is consuming a second instance 38 of the interactive experience implemented on another computing device 12*c*. In the second instance 38, the second player P2 controls a second player character PC2 to interact with the non-player character NPC1. Note that the second player character PC2 may alternatively be interacting with a different non-player character. Note also that the second player character PC2 may be the same as the first player character PC1. The first and second players P1, P2 may be consuming the interactive experience at the same time such that interactions, or other activities, are occurring within the different instances 36, 38 in parallel.

In each instance 36, 38, the respective player P1, P2 provides input dialogue 381, 382 to the respective input device 12*a*, 12*c* which is provided as input to a respective utterance generator module 362, 382. Each instance 36, 38 has a respective activity history set H1, H2 in respective activity history databases 363, 383 stored at the respective local computing devices 12*a*, 12*c*. The activity history sets H1, H2 include the entire activity history of the respective instance 36, 38 of the interactive experience. In each instance 36, 38, a respective subset h1, h2 of the most relevant activity history data is selected from the respective activity history set H1, H2 for input to the respective utterance generator module 362, 382.

Like in FIG. 2, in FIG. 3 there is included a context set C1 of established context data within the interactive experience stored in a context database 301. The context database 301 is located centrally, e.g. in the central server device 14 in the described example. In each instance 36, 38, a respective subset c1, c2 of the most relevant established context data is selected from the context set C1 for input to the respective utterance generator module 362, 382.

The utterance generator modules 362, 382 generate respective output dialogue 364, 384 to be uttered by the respective non-player character involved in the interaction, towards the respective player character, and output to the respective player P1, P2.

Like in FIG. 2, in FIG. 3 there is included an emergent lore resolver module 302 (or update module) for determining how to merge emerging context/lore into the context set C1. The resolver module 302 is located centrally. The generated dialogue 364, 384 ('emergent lore') from each instance 36, 38 is transmitted to an emergent lore receive queue module 303. In the described example, the queue module 303 passes portions/segments of emergent lore to the resolver module 302 sequentially in the order it is received. The resolver module 302 processes each segment of emergent lore (generated dialogue) in turn to determine if and how to update the context set C1, as described above. The way in which the context set C1 is updated based on a first segment of emergent lore may impact the way in which the (now updated) context set C1 is updated based on a second segment of emergent lore that is processed after the first segment. In this way, subsequent interactions that occur in either of the instances 36, 38 of the interactive experience will involve generating activity/dialogue that takes into account previous interactions (in all of the instances) and so the activity generation remains consistent across all of the instances 36, 38.

Figure 4:
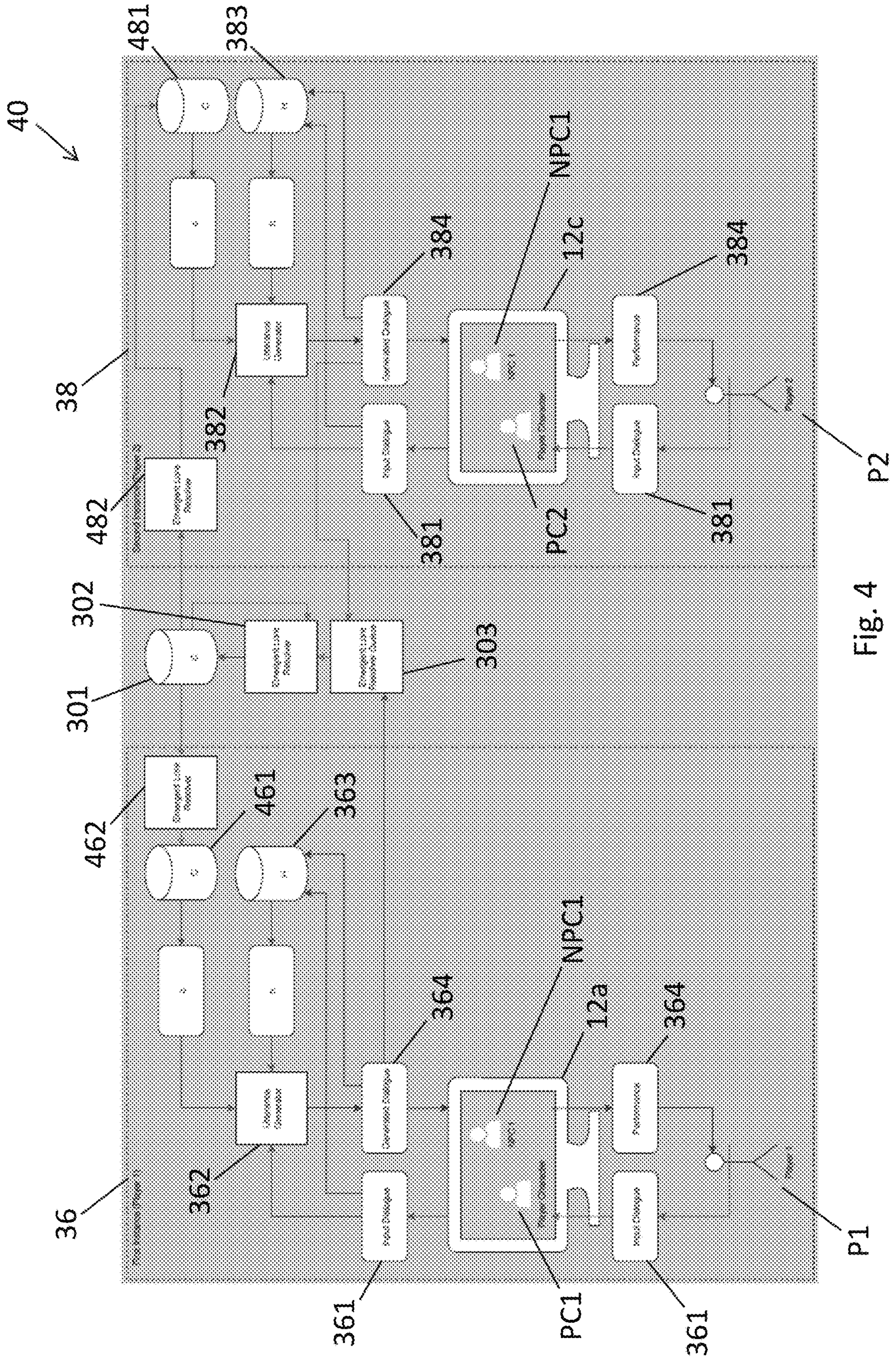

FIG. 4 schematically illustrates an interactive experience architecture 40 in accordance with examples of the invention. Like in the example illustrated in FIG. 3, in FIG. 4 two different players P1, P2 are consuming two different instances 36, 38 of the interactive experience.

FIG. 4 differs from FIG. 3 in that each instance 36, 38 has a local version of the context set C1 associated therewith. In particular, the first instance 36 has a first local context set LC1 stored in a local context database 461. The local context database 461 may be stored in the memory device 122 of the local computing device 12*a* implementing the first instance 36 of the interactive experience. Similarly, the second instance 38 has a second local context set LC2 stored in a local context database 481, e.g. in the memory device 122 of the local computing device 12*c*.

The local context databases 461, 481 may be updated to merge updates from the (central/global) context database 301, e.g. to merge emergent lore from the (central) context database 301 into the established lore in the local context databases 461, 481. This may be performed by a respective local emergent lore resolver module 462, 482 (or respective local update module) of each instance 36, 38. For instance, updates/emergent lore may be transmitted periodically (across the network 16) from the central context database 301. Alternatively, the local context databases 461, 481 may pull/request updates/emergent lore from the central context database 301, e.g. periodically and/or upon initiation of the respective instance of the interactive experience. The emergent lore resolver modules 462, 482 may determine if and how to merge emergent lore from the central context database 301 into the local context sets of the local context databases 461, 481 in a similar manner to how emergent lore is processed in the (central) emergent lore resolver module 302. This assists in addressing the potential issue that the local context sets LC1, LC2 may include conflicts relative to the (central) context set C1 such that emergent lore in the (central) context set C1 may not necessarily be able to be simply included unmodified in the local context sets LC1, LC2.

Although not indicated in FIG. 4, the local emergent lore resolver modules 462, 482 may receive emergent lore from the respective activity history databases 363, 383 (and/or directly from the utterance generator modules 362, 382 and/or the received input activity data 361, 381). The local emergent lore resolver modules 462, 482 may determine if and how to update the local context sets LC1, LC2 in the local context databases 461, 481 in a similar manner to as described above. In some examples emergent lore from the central context database 301 may be prioritized by the local emergent lore resolver modules 462, 482 over the emergent lore from activity history databases 363, 383. In some examples, the central emergent lore resolver module 302 (e.g., via the central queue module 303) may receive emergent lore from the local context databases 461, 481, with this emergent lore being processed as described above to determine if and how to merge it into the context set in the central context database 301.

These implementations are advantageous in that, having local versions of the context set means that the established lore/context is available without delays/lag for use in generating output activities/dialogue of NPCs, while a centrally updated version of the context set ensures that emergent lore from multiple different instances of the interactive experience is integrated into the established lore/context that is used by all of the multiple instances.

Figure 5:
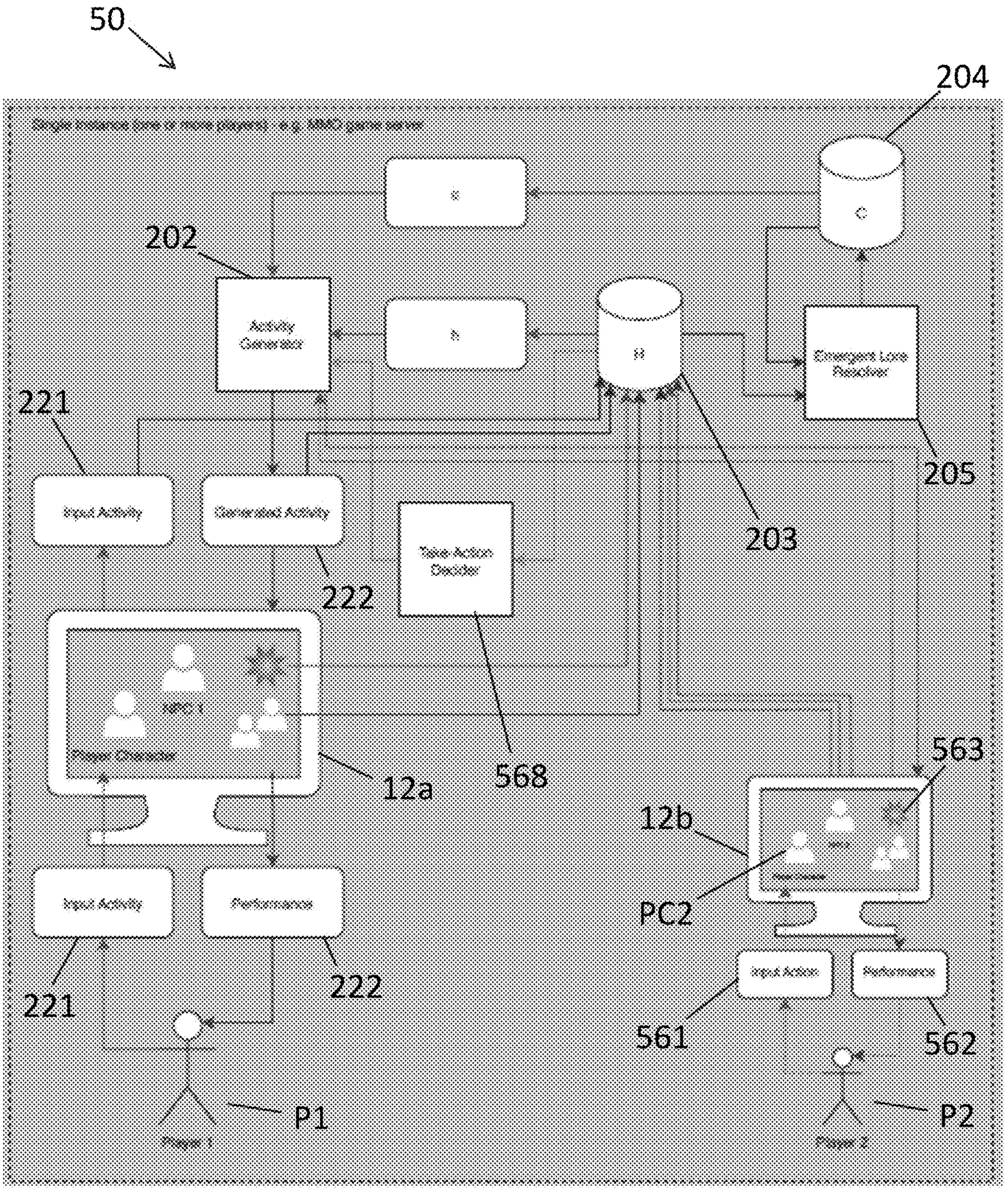

FIG. 5 schematically illustrates an interactive experience architecture 50 in accordance with examples of the invention. Like in FIG. 2, FIG. 5 illustrates a single instance of the interactive experience. Unlike in FIG. 2, in FIG. 5 there are multiple players consuming the same, single instance of the interactive experience. That is, FIG. 5 illustrates a multiplayer experience such as a massively multiplayer online (MMO) game that may be hosted on an MMO server.

As in FIG. 2, the player P1 controls a player character PC1 to perform an activity, e.g. utter dialogue, according to an input activity 221 and, in response, a non-player character NPC1 is controlled automatically to perform an output activity 222 determined by the activity/utterance generator module 202 as described above.

In FIG. 5, a second player P2 is acting within, or consuming, the same instance of interactive experience, at the same time as the first player P1. In the described example, the second player P2 is consuming the interactive experience on a different computing device 12*b* from the first player P1, but in some examples both players may consume the interactive experience on the same computing device, e.g. via a split screen.

Any activities generated as a result of the second player's P2 interactions are used to update the activity history set H1 of the local activity history of this instance of the interactive experience. This may include an input activity 561 from the second player P2, a generated output activity 562 from a non-player character NPC2 that the second player character PC2 is interacting with, and/or other events, e.g. explosions 563, that occur within the experience being consumed by the second player P2.

This means that activities occurring as a result of the second player's P2 interactions influence the generated output activity 222 for the first player P1 that is determined by the activity generation module 202. In addition, all of the activities occurring across the multiple players P1, P2 are provided to the emergent lore resolver module 205 to determine if and how this emergent lore is to be integrated into the context set C1 (which may be stored locally or centrally).

In the example illustrated in FIG. 5, a take action decider module 568 determines whether characters need to take an action based on activities occurring in the instance of the interactive experience. For instance, if an explosion occurs near a first character then the first character may be controlled to run away. On the other hand, if a second character is not near the explosion then the second character may take no action.

Figure 6:
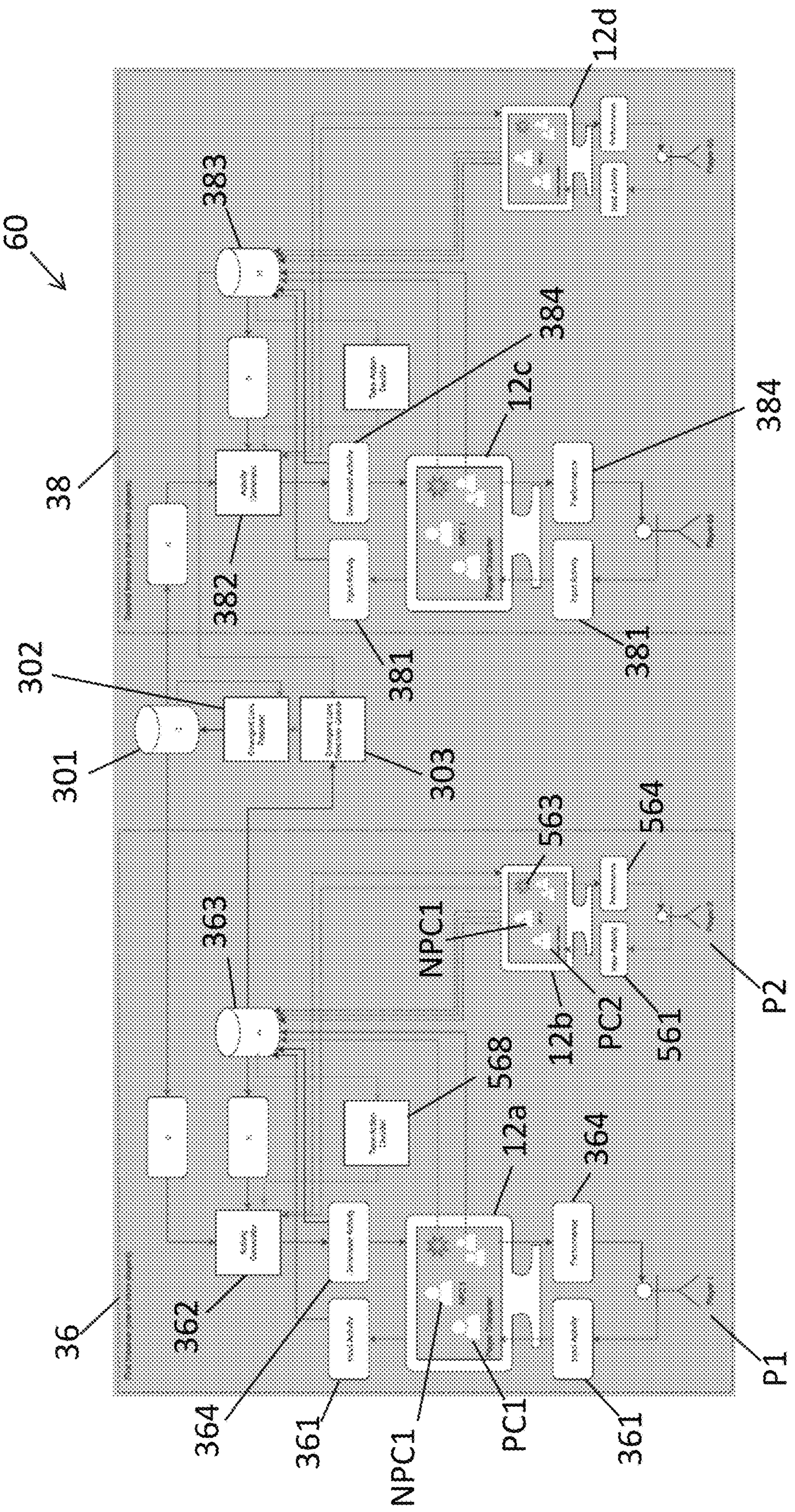

FIG. 6 schematically illustrates an interactive experience architecture 60 in accordance with examples of the invention. In particular, the example of FIG. 6 is a combination of the examples illustrated in FIGS. 3 and 5. Specifically, the example of FIG. 6 combines multiple instances as in FIG. 3 with multiple players per instance as in FIG. 5, while maintaining a single context set C1.

Figure 7:
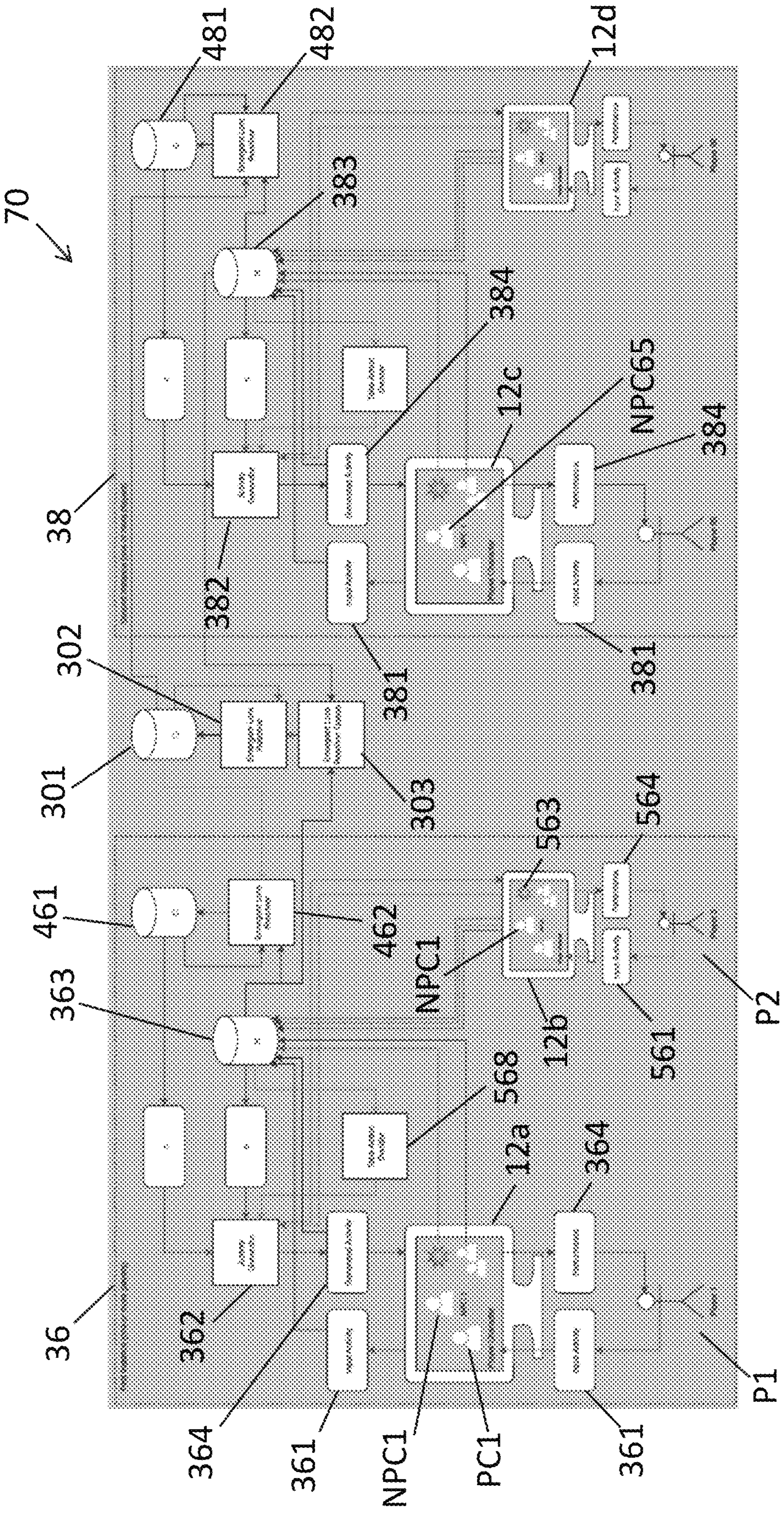

FIG. 7 schematically illustrates an interactive experience architecture 70 in accordance with examples of the invention. In particular, the example of FIG. 7 is a combination of the examples illustrated in FIGS. 4 and 5. Specifically, the example of FIG. 7 combines multiple instances as in FIG. 4 with multiple players per instance as in FIG. 5, with each instance maintaining a local version of the context set LC1, LC2 and a (central) context set C1 being stored (and updated with emergent lore) centrally. FIG. 7 illustrates how the local emergent lore resolver modules 462, 482 can be used to merge emergent lore from the respective activity history databases 363, 383 into the (local) context sets of the local context databases 461, 481, as described above.

Figure 8:
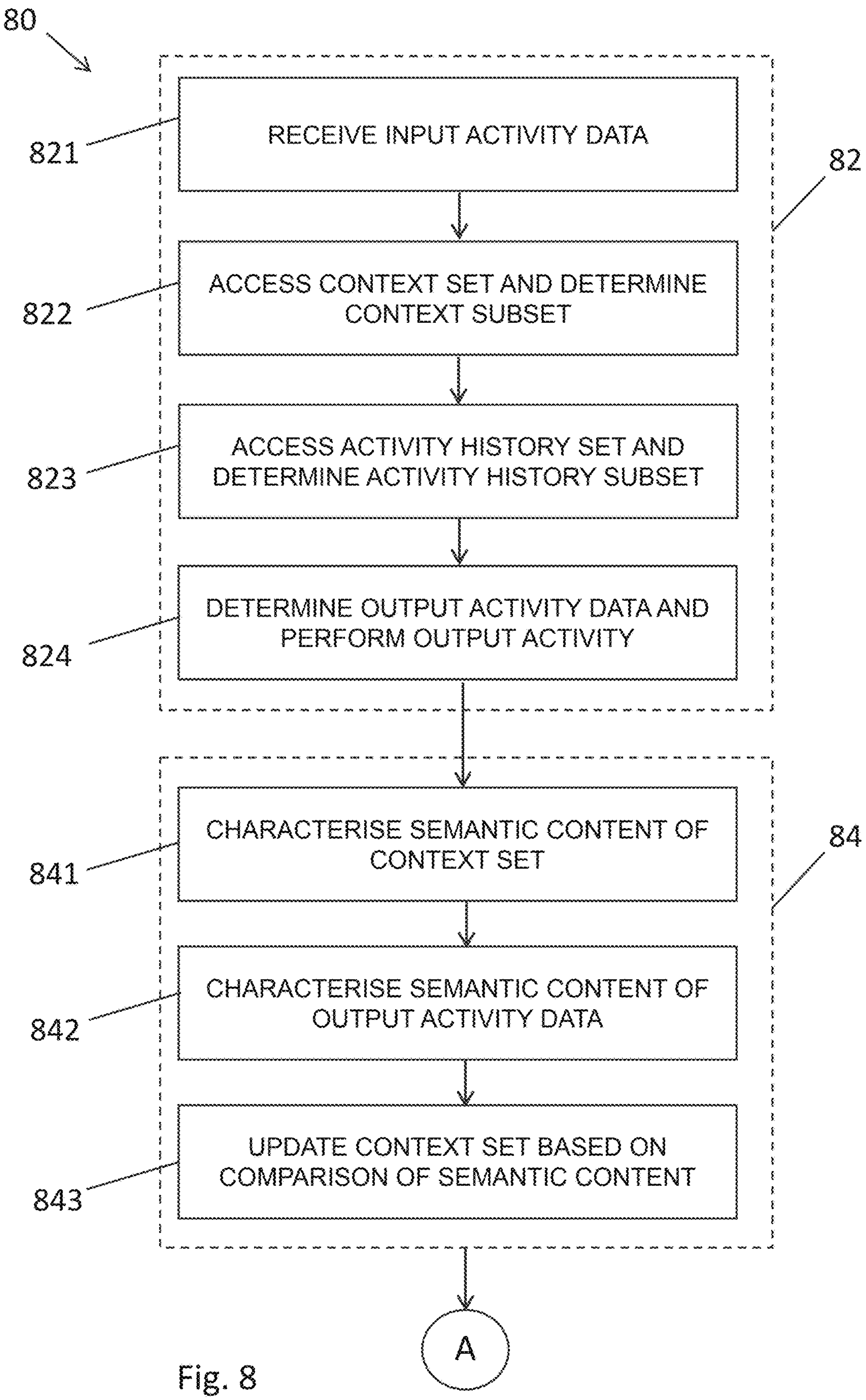
FIG. 8 shows the steps of a method in accordance with examples of the invention, implemented by the system of FIG. 1.
Figure 8:
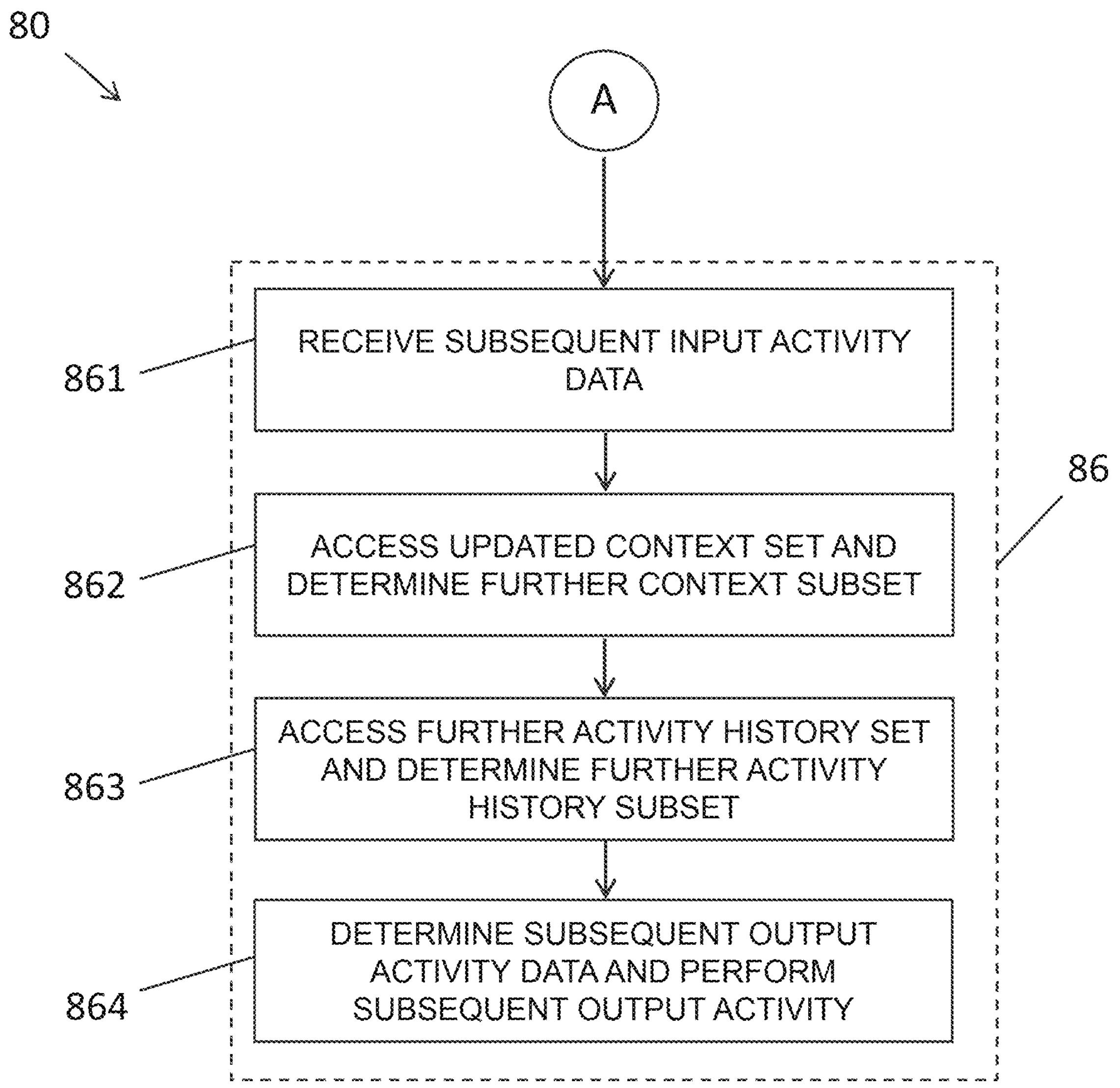

FIG. 8 shows the steps of a method 80 in accordance with examples of the invention. The steps of the method 80 are computer-implemented, e.g. by one or more computer processors 121, 141. The method 80 is for determining activities to be performed by at least one non-player character, e.g. NPC1, NPC2, in an interactive experience.

The method 80 includes performing an activity generation task 82. At step 821, the activity generation task 82 involves receiving input activity data 221, 361, 381 indicative of an input activity occurring within an instance 36, 38 of the interactive experience. At step 822, the activity generation task 82 involves accessing, from a context database 204, 301, 461, 481, a context set of entire established context data within the interactive experience, and determining, based on relevance to the activity generation task 82, a context subset of established context data from the context set. At step 823, the activity generation task 82 involves accessing, from an activity history database 203, 363, 383, an activity history set of entire activity history data in the instance of the interactive experience, and determining, based on relevance to the activity generation task 82, an activity history subset of activity history data from the activity history set. At step 824, the activity generation task 82 involves determining, using an activity model in the form of a trained generative machine learning (ML) model (e.g. implemented in an utterance generator module 202, 362, 382), output activity data 222, 364, 384 indicative of an output activity to be performed by an NPC of the at least one NPC, based on the received input activity data 221, 361, 381, the context subset of established context data, and the subset of activity history data, and controlling the NPC to perform the output activity.

The method 80 includes a merging process 84 to merge emergent lore into the context set. The merging process 84 may be performed locally and/or centrally across a network 16. The merging process 84 involves updating the context set of entire established context data based on the output activity data 222, 364, 384 to obtain an updated context set of entire established context data. The merging process 84 involves, at step 841, characterizing semantic content of the context set of entire established context data. The merging process 84 involves, at step 842, characterizing semantic content of the output activity data 222, 364, 384. The merging process 84 involves, at step 843, updating the context set to obtain the updated context set based on a comparison of the semantic content of the context set and the semantic content of the output activity data.

The method 80 includes performing a subsequent activity generation task 86, subsequent to the activity generation task 82. At step 861, the subsequent activity generation task 86 involves receiving subsequent input activity data 241 indicative of a subsequent input activity, different from the input activity 221, occurring within an instance 36, 38 (which can be the same as, or different from, the instance 36, 38 within which the activity generation task 82 is performed) of the interactive experience. At step 862, the subsequent activity generation task 86 involves accessing, from the context database 204, 301, 461, 481, the updated context set of entire established context data, and determining, based on relevance to the subsequent activity generation task 86, a further context subset of established context data from the updated context set. At step 863, the subsequent activity generation task 86 involves accessing, from a further activity history database 203, 363, 383 (which may be the same as or different from the activity history database), a further set of entire activity history data in the further instance 36, 38 of the interactive experience, and determining, based on relevance to the subsequent activity generation task 86, a further subset of activity history data from the further set. At step 864, the subsequent activity generation task 86 involves determining, using a further activity model (which may be the same as or different from the activity model) in the form of a trained generative ML model, subsequent output activity data 242 indicative of a subsequent output activity to be performed by a further NPC (which may be same as or different from the NPC) of the at least one NPC, based on the received subsequent input activity data 241, the further context subset of established context data, and the further subset of activity history data, and controlling the further NPC to perform the determined subsequent output activity.

Many modifications may be made to the described examples without departing from the scope of the appended claims.

In the examples described above, only a subset of each of the context set and activity history set is provided to the activity model(s) as input so as not to exceed the context window size. However, in some examples it may be that one or both of the context set and the activity history set can be provided in their entirety to the activity model as input without exceeding the context window size. This may for instance occur near to the start of an interactive experience when there is still only a relatively small amount of activity history and/or established lore.

In the examples described above, emergent lore in the form of generated output activity performed by an NPC is used to update the established lore, with emergent lore from other sources—such as input activity, e.g. from a player, or other events occurring within the interactive experience, e.g. explosions—in some embodiments being used in addition as emergent lore to update the established lore. However, it will be understood that in different examples of the invention emergent lore from a combination of any one or more of these sources may be used to update the context set of established lore. For instance, in one example emergent lore in the form of input activity only is used to update the established lore.

In the examples described above, a player inputs input activity data, e.g. via an input device such as a keyboard or microphone, to control a player character within the interactive experience to perform an input activity, e.g. utter dialogue. It will be understood that in some examples a player character may not be represented (visually or audibly) within the interactive experience. Instead, in some examples the input activity data received from the player may simply be received as input activity (e.g. dialogue via a microphone) into the interactive experience without this being represented (visually or audibly) within the interactive experience, but with this still be used to generate a response activity of an NPC and/or being used as emergent lore to update the established lore.

Examples of the invention are outlined in the following numbered clauses.

(A1) A computer-implemented method for determining activities to be performed by at least one non-player character (NPC) in an interactive experience, the method comprising, at one or more processors: performing an activity generation task, comprising: receiving input activity data indicative of an input activity occurring within an instance of the interactive experience; accessing, from a context database, a context set of entire established context data within the interactive experience, and determining, based on relevance to the activity generation task, a context subset of established context data from the context set; accessing, from an activity history database, an activity history set of entire activity history data in the instance of the interactive experience, and determining, based on relevance to the activity generation task, an activity history subset of activity history data from the activity history set; determining, using an activity model in the form of a trained generative machine learning (ML) model, output activity data indicative of an output activity to be performed by an NPC of the at least one NPC, based on the received input activity data, the context subset of established context data, and the subset of activity history data, and controlling the NPC to perform the output activity; updating the context set of entire established context data based on the output activity data to obtain an updated context set of entire established context data. Updating the context set comprises: characterizing semantic content of the context set of entire established context data; characterizing semantic content of the output activity data; and updating the context set to obtain the updated context set based on a comparison of the semantic content of the context set and the semantic content of the output activity data. The method further includes: performing a subsequent activity generation task, subsequent to the activity generation task, including: receiving subsequent input activity data indicative of a subsequent input activity, different from the input activity, occurring within a further instance of the interactive experience; accessing the updated context set of entire established context data, and determining, based on relevance to the subsequent activity generation task, a further context subset of established context data from the updated context set. The method further includes: accessing, from a further activity history database, a further set of entire activity history data in the further instance of the interactive experience, and determining, based on relevance to the subsequent activity generation task, a further subset of activity history data from the further set; and determining, using a further activity model in the form of a trained generative ML model, subsequent output activity data indicative of a subsequent output activity to be performed by a further NPC of the at least one NPC, based on the received subsequent input activity data, the further context subset of established context data, and the further subset of activity history data, and controlling the further NPC to perform the determined subsequent output activity.

(A2) The method according to (A1), where updating the context set of entire established context data comprises performing one or more of:

i. discarding the output activity data without integrating it into the context set;
ii. integrating the output activity data into the context set without modifying any of the established context data in the context set; in some embodiments, at least some of the output activity data is modified prior to it being integrated into the context set; and
iii. integrating the output activity data into the context set and modifying at least some of the established context data in the context set to remove conflicts between semantic content of the output activity data and the established context data in the context set; in some embodiments, at least some of the output activity data is modified prior to it being integrated into the context set;
iv. to obtain the updated context set.

(A3) The method according to (A2), where updating the context set of entire established context data comprises:

categorizing the output activity data into one or more categories of a plurality of defined categories; and determining whether to perform step (i), (ii) or (iii) based on the one or more categories into which the output activity data is categorized.

(A4) The method according to (A3), where the plurality of defined categories includes one or more of:

an additive category for data having semantic content that is not contained in the context set;

a supportive category for data having semantic content that is included in a less specific form in the context set;

a conflicting category for data having semantic content that contradicts semantic content of established context data in the context set; or a redundant category for data having semantic content that is already included in the context set.

(A5) The method according to (A3) or (A4), where updating the context set of entire established context data comprises:

determining a value for each of one or more context metrics based on semantic content of the output activity data and the one or more categories into which the output activity data is categorized; and determining whether to perform step (i), (ii) or (iii) based on the one or more context metric values.

(A6) The method according to (A5), where one of the context metrics is a consistency metric indicative of a measure of consistency of semantic content of the output activity data relative to semantic content of the established context data in the context set.

(A7) The method according to (A5) or (A6), where the one or more context metrics include one or more of:

a player experience metric indicative of a measure of a player's experience within the interactive experience;

a direction metric indicative of a measure of to what degree semantic content of the output activity data expands a coverage of semantic content of established context data in a defined direction;

an alignment metric indicative of a measure of to what degree semantic content of the output activity data is aligned with semantic content of originally established context data; or a quality metric indicative of a measure of quality of semantic content being added by the output activity data.

(A8) The method according to any of (A1)-(A7), where updating the context set comprises executing a context model in the form of a trained generative ML model to compare the semantic content of the context set and the semantic content of the output activity data, and the output of the context model comprises an instruction for how to update the context set to obtain the updated context set.

(A9) The method according to (A8), where characterizing semantic content of the output activity data comprises obtaining at least one semantic vector representing the output activity data, wherein the at least one semantic vector is configured to be received as input into the context model.

(A10) The method according to (A8) or (A9), where characterizing semantic content of the context set of entire established context data comprises obtaining at least one semantic vector representing at least some of the context set of entire established context data, wherein the at least one semantic vector is configured to be received as input into the context model.

(A11) The method according to any of (A1)-(A10), where updating the context set comprises:

characterizing semantic content of the input activity data; and updating the context set to obtain the updated context set based on a comparison of the semantic content of the context set and the semantic content of the input activity data.

(A12) The method according to any of (A1)-(A11), where the further NPC is the same as the NPC.

(A13) The method according to any of (A1)-(A12), where the context database is a global context database stored at a location remote from the one or more processors and accessible by the one or more processors via a network. In some embodiments, the remote location is a Cloud-based server location.

(A14) The method according to any of (A1)-(A13), where the activity generation task is implemented by one or more processors of the one or more processors, and the method comprises: performing a second activity generation task, implemented by a second one or more processors of the one or more processors, the second activity generation task comprising:

receiving second input activity data indicative of a second input activity occurring within a second instance of the interactive experience;

accessing, from a second context database, a second context set of entire established context data within the interactive experience, and determining, based on relevance to the second activity generation task, a second context subset of established context data from the second context set;

accessing, from a second activity history database, a second activity history set of entire activity history data in the second instance of the interactive experience, and determining, based on relevance to the second activity generation task, a second activity history subset of activity history data from the second activity history set; and determining, using a second activity model in the form of a trained generative ML model, second output activity data indicative of a second output activity to be performed by the NPC, based on the received second input activity data, the second context subset of established context data, and the second activity history subset of activity history data, and controlling the NPC to perform the second output activity, the method comprising updating the second context set of entire established context data based on the second output activity data to obtain a second updated context set of entire established context data, wherein updating the second context set comprises:

characterizing semantic content of the second context set of entire established context data;

characterizing semantic content of the second output activity data; and updating the second context set to obtain the second updated context set based on a comparison of the semantic content of the second context set and the semantic content of the second output activity data.

(A15) The method according to (A14), where the second context set is the same as the context set, the second context database is the same as the context database, and the context database is a global context database stored at a location remote from the one or more processors and accessible by the one or more processors via a network. In some embodiments, the remote location is a Cloud-based server location.

(A16) The method according to (A15), where the method comprises receiving the output activity data and the second output activity data at an update module for updating the context set, and the context set is updated based on an order in which the output activity data and the second output activity data is received at the update module.

(A17) The method according to (A14), where the second context database is different from the context database, the context database is an instance context database of entire established context data within the instance of the interactive experience, and the second context database is a second instance context database of entire established context data within the second instance of the interactive experience. The method comprises receiving the output activity data and the second output activity data at an update module for updating a central context set of entire established context stored in a global context database at a location remote from the one or more processors and accessible by the one or more processors via a network, and the context set is updated based on an order in which the output activity data and the second output activity data is received at the update module.

(A18) The method according to (A17), where the method comprises updating the context set and the second context set stored at the instance context database and the second instance context database, respectively, based on an indication of updates to the central context set from the global context database via the network; in some embodiments, the indication of updates are received periodically.

(A19). A method according to (A18) or (A19), where the method comprises updating the central context set stored at the global context database based on an indication of updates, received via the network, to the context set stored at the instance context database and/or the second context set stored at the second instance context database.

(A20) The method according to any of (A1)-(A19), where the method comprises updating the activity history set of entire activity history data to include the input activity.

(A21). The method according to any of (A1)-(A20), where the context database is an instance context database of entire established context data within the instance of the interactive experience, and updating the context set comprises updating the context set stored at the instance context database.

(A22) The method according to (A21), where the method comprises:

- at the one or more processors, transmitting, via the network, updates to the context set stored at the instance context database to a central server;
- at the central server:
- receiving the updates to the context set;
- updating a global context set, stored at a global context database, of established context data within the interactive experience based on the received updates; and
- transmitting, via the network, updates to the global context set stored at the global context database for updating the context set stored at the instance context database.

(A23) The method according to any of (A1)-(A22), where the input activity includes one or more of:

- a portion of dialogue being uttered, or an action being performed, by a player character (PC) of one or more PCs in the instance of the interactive experience;
- a portion of dialogue being uttered, or an action being performed, by an NPC of the one or more NPCs in the instance of the interactive experience; or
- an event occurring in the instance of the interactive experience.

(A24) The method according to any of (A1)-(A23), where determining the context subset of established context data from the context set comprises selecting an amount of established context data, from the context set to be included in the context subset, that is no greater than a defined size of a context window to be used as input to the trained generative ML model; in some embodiments, the defined size is a defined number of tokens.

(A25) The method according to any of (A1)-(A24), where determining, based on relevance to the activity generation task, the context subset of established context data from the context set comprises:

- obtaining a plurality of context semantic vectors representing the established context data in context set, wherein each context semantic vector of the plurality of context semantic vectors represents a portion of the established context data; in some embodiments, each portion is a document, a paragraph, a sentence, a phrase, a word or part of a word in the established context data;
- obtaining at least one input semantic vector representing the received input activity data;
- determining a value of a semantic similarity metric between the at least one input semantic vector and each of the respective context similarity vectors, indicative of relevance of the respective portion of the established context data to the activity generation task;
- selecting one or more portions of the established context data for inclusion in the context subset based on the determined semantic similarity metric values associated with the respective portions of established context data in the context set.

(A26) The method according to (A25), where selecting one or more portions of the established context data comprises:

- ordering in a list, from highest value to lowest value, the portions of established context data in the context set according to the associated semantic similarity metric values; and
- selecting a defined number of the top portions of established context data in the list.

(A27) The method according to any of (A1)-(A26), where the activities to be performed by the at least one NPC are one or more of: uttering a portion of dialogue; performing a physical action; and performing an animation.

(A28) The method according to any of (A1)-(A27), wherein the interactive experience is a video game experience.

(B1). A system for controlling at least one non-player character (NPC) in an interactive experience to perform activities within the interactive experience, the system comprising one or more processors configured to:

- perform an activity generation task, comprising the one or more processors being configured to:
- receive input activity data indicative of an input activity occurring within the interactive experience;
- access, from a context database, a context set of entire established context data within the interactive experience, and determine, based on relevance to the activity generation task, a context subset of established context data from the context set;
- access, from an activity history database, an activity history set of entire activity history data in an instance of the interactive experience, and determine, based on relevance to the activity generation task, an activity history subset of activity history data from the activity history set;
- determine, using an activity model in the form of a trained generative machine learning (ML) model, output activity data indicative of an output activity to be performed by the NPC, based on the received input activity data, the context subset of established context data, and the subset of activity history data, and control the NPC to perform the output activity;

update the context set of entire established context data based on the output activity data to obtain an updated context set of entire established context data, wherein to update the context set the one or more processors are configured to:

characterize semantic content of the context set of entire established context data;

characterize semantic content of the output activity data; and update the context set to obtain the updated context set based on a comparison of the semantic content of the context set and the semantic content of the output activity data;

perform a subsequent activity generation task, subsequent to the activity generation task, comprising the one or more processors being configured to:

receive subsequent input activity data indicative of a subsequent input activity occurring within the interactive experience;

access the updated context set of entire established context data, and determine, based on relevance to the subsequent activity generation task, a further context subset of established context data from the updated context set;

access, from a further activity history database, a further set of entire activity history data in a further instance of the interactive experience, and determine, based on relevance to the subsequent activity generation task, a further subset of activity history data from the further set; and determine, using a further activity model in the form of a trained generative ML model, subsequent output activity data indicative of a subsequent output activity to be performed by the further NPC, based on the received subsequent input activity data, the further context subset of established context data, and the further subset of activity history data, and control the further NPC to perform the determined subsequent output activity.

(C1) A method of updating a context database storing a context set of entire established context data within an interactive experience, the method comprising, at one or more processors:

receiving output activity data indicative of an output activity to be performed by a non-player character (NPC), of one or more NPCs, in an instance of the interactive experience;

receiving second output activity data indicative of a second output activity to be performed by a second NPC, of the one or more NPCs, in a second instance of the interactive experience;

identifying that the output activity data is received prior to the second output activity data;

performing an update task, comprising:

characterizing semantic content of the context set of entire established context data;

characterizing semantic content of the received output activity data; and updating the context set to obtain the updated context set based on a comparison of the semantic content of the context set and the semantic content of the output activity data;

performing a subsequent update task, comprising:

characterizing semantic content of the updated context set of entire established context data;

characterizing semantic content of the received second output activity data; and updating the updated context set to obtain a further updated context set based on a comparison of the semantic content of the updated context set and the semantic content of the second output activity data, where the further updated context set is provided for use in determining subsequent output activity data indicative of activities to be performed by at least one of the one or more NPCs in the instance or the second instance of the interactive experience.

What is claimed is:

1. A computer-implemented method for determining activities to be performed by at least one non-player character (NPC) in an interactive experience, the method comprising, at one or more processors:

performing an activity generation task, comprising:

receiving input activity data indicative of an input activity occurring within an instance of the interactive experience;

accessing, from a context database, a context set of entire established context data within the interactive experience, and determining, based on relevance to the activity generation task, a context subset of established context data from the context set;

accessing, from an activity history database, an activity history set of entire activity history data in the instance of the interactive experience, and determining, based on relevance to the activity generation task, an activity history subset of activity history data from the activity history set; and determining, using an activity model in the form of a trained generative machine learning (ML) model, output activity data indicative of an output activity to be performed by an NPC of the at least one NPC, based on the received input activity data, the context subset of established context data, and the subset of activity history data, and controlling the NPC to perform the output activity;

updating the context set of entire established context data based on the output activity data to obtain an updated context set of entire established context data, wherein updating the context set comprises:

characterizing semantic content of the context set of entire established context data;

characterizing semantic content of the output activity data; and updating the context set to obtain the updated context set based on a comparison of the semantic content of the context set and the semantic content of the output activity data; and performing a subsequent activity generation task, subsequent to the activity generation task, comprising:

receiving subsequent input activity data indicative of a subsequent input activity, different from the input activity, occurring within a further instance of the interactive experience;

accessing the updated context set of entire established context data, and determining, based on relevance to the subsequent activity generation task, a further context subset of established context data from the updated context set;

accessing, from a further activity history database, a further set of entire activity history data in the further instance of the interactive experience, and determining, based on relevance to the subsequent activity generation task, a further subset of activity history data from the further set; and determining, using a further activity model in the form of a trained generative ML model, subsequent output activity data indicative of a subsequent output activity to be performed by a further NPC of the at least one NPC, based on the received subsequent input activity data, the further context subset of established context data, and the further subset of activity history data, and controlling the further NPC to perform the determined subsequent output activity.

2. A method according to claim 1, wherein updating the context set of entire established context data comprises performing one or more of:

(i) discarding the output activity data without integrating it into the context set;

(ii) integrating the output activity data into the context set without modifying any of the established context data in the context set; and (iii) integrating the output activity data into the context set and modifying at least some of the established context data in the context set to remove conflicts between semantic content of the output activity data and the established context data in the context set;

to obtain the updated context set.

3. A method according to claim 2, wherein updating the context set of entire established context data comprises:

categorizing the output activity data into one or more categories of a plurality of defined categories; and determining whether to perform step (i), (ii) or (iii) based on the one or more categories into which the output activity data is categorised.

4. A method according to claim 3, wherein the plurality of defined categories includes one or more of:

an additive category for data having semantic content that is not contained in the context set;

a supportive category for data having semantic content that is included in a less specific form in the context set;

a conflicting category for data having semantic content that contradicts semantic content of established context data in the context set; and a redundant category for data having semantic content that is already included in the context set.

5. A method according to claim 3, wherein updating the context set of entire established context data comprises:

determining a value for each of one or more context metrics based on semantic content of the output activity data and the one or more categories into which the output activity data is categorized; and determining whether to perform step (i), (ii) or (iii) based on the one or more context metric values.

6. A method according to claim 5, wherein one of the context metrics is a consistency metric indicative of a measure of consistency of semantic content of the output activity data relative to semantic content of the established context data in the context set.

7. A method according to claim 5, wherein the one or more context metrics include one or more of:

a player experience metric indicative of a measure of a player's experience within the interactive experience;

a direction metric indicative of a measure of to what degree semantic content of the output activity data expands a coverage of semantic content of established context data in a defined direction;

an alignment metric indicative of a measure of to what degree semantic content of the output activity data is aligned with semantic content of originally established context data; and a quality metric indicative of a measure of quality of semantic content being added by the output activity data.

8. A method according to claim 1, wherein updating the context set comprises executing a context model in the form of a trained generative ML model to compare the semantic content of the context set and the semantic content of the output activity data, wherein an output of the context model comprises an instruction for how to update the context set to obtain the updated context set.

9. A method according to claim 8, wherein characterizing semantic content of the output activity data comprises obtaining at least one semantic vector representing the output activity data, wherein the at least one semantic vector is configured to be received as input into the context model.

10. A method according to claim 8, wherein characterizing semantic content of the context set of entire established context data comprises obtaining at least one semantic vector representing at least some of the context set of entire established context data, wherein the at least one semantic vector is configured to be received as input into the context model.

11. A method according to claim 1, wherein updating the context set comprises:

characterizing semantic content of the input activity data; and updating the context set to obtain the updated context set based on a comparison of the semantic content of the context set and the semantic content of the input activity data.

12. A method according to claim 1, wherein the activity generation task is implemented by one or more processors of the one or more processors, the method comprising performing a second activity generation task, implemented by a second one or more processors of the one or more processors, the second activity generation task comprising:

receiving second input activity data indicative of a second input activity occurring within a second instance of the interactive experience;

accessing, from a second context database, a second context set of entire established context data within the interactive experience, and determining, based on relevance to the second activity generation task, a second context subset of established context data from the second context set;

accessing, from a second activity history database, a second activity history set of entire activity history data in the second instance of the interactive experience, and determining, based on relevance to the second activity generation task, a second activity history subset of activity history data from the second activity history set; and determining, using a second activity model in the form of a trained generative ML model, second output activity data indicative of a second output activity to be performed by the NPC, based on the received second input activity data, the second context subset of established context data, and the second activity history subset of activity history data, and controlling the NPC to perform the second output activity, the method comprising updating the second context set of entire established context data based on the second output activity data to obtain a second updated context set of entire established context data, wherein updating the second context set comprises:

characterizing semantic content of the second context set of entire established context data;

characterizing semantic content of the second output activity data; and updating the second context set to obtain the second updated context set based on a comparison of the semantic content of the second context set and the semantic content of the second output activity data.

13. A method according to claim 12, wherein the second context set is the same as the context set, wherein the second context database is the same as the context database, wherein the context database is a global context database stored at a location remote from the one or more processors and accessible by the one or more processors via a network.

14. A method according to claim 13, the method comprising receiving the output activity data and the second output activity data at an update module for updating the context set, wherein the context set is updated based on an order in which the output activity data and the second output activity data is received at the update module.

15. A method according to claim 12, wherein the second context database is different from the context database, wherein the context database is an instance context database of entire established context data within the instance of the interactive experience, wherein the second context database is a second instance context database of entire established context data within the second instance of the interactive experience, the method comprising receiving the output activity data and the second output activity data at an update module for updating a central context set of entire established context data stored in a global context database at a location remote from the one or more processors and accessible by the one or more processors via a network, wherein the central context set is updated based on an order in which the output activity data and the second output activity data is received at the update module.

16. A method according to claim 15, the method comprising updating the context set and the second context set stored at the instance context database and the second instance context database, respectively, based on an indication of updates to the central context set from the global context database via the network; optionally, wherein the indication of updates is received periodically.

17. A method according to claim 15, the method comprising updating the central context set stored at the global context database based on an indication of updates, received via the network, to the context set stored at the instance context database and/or the second context set stored at the second instance context database.

18. A method according to claim 17, the method comprising:

at the one or more processors, transmitting, via the network, updates to the context set stored at the instance context database to a central server; and at the central server:

receiving the updates to the context set;

updating a global context set, stored at the global context database, of established context data within the interactive experience based on the received updates; and transmitting, via the network, updates to the global context set stored at the global context database for updating the context set stored at the instance context database.

19. A system for controlling at least one non-player character (NPC) in an interactive experience to perform activities within the interactive experience, the system comprising one or more processors configured to:

perform an activity generation task, comprising the one or more processors being configured to:

receive input activity data indicative of an input activity occurring within the interactive experience;

access, from a context database, a context set of entire established context data within the interactive experience, and determine, based on relevance to the activity generation task, a context subset of established context data from the context set;

access, from an activity history database, an activity history set of entire activity history data in an instance of the interactive experience, and determine, based on relevance to the activity generation task, an activity history subset of activity history data from the activity history set; and determine, using an activity model in the form of a trained generative machine learning (ML) model, output activity data indicative of an output activity to be performed by the NPC, based on the received input activity data, the context subset of established context data, and the subset of activity history data, and control the NPC to perform the output activity;

update the context set of entire established context data based on the output activity data to obtain an updated context set of entire established context data, wherein to update the context set the one or more processors are configured to:

characterize semantic content of the context set of entire established context data;

characterize semantic content of the output activity data; and update the context set to obtain the updated context set based on a comparison of the semantic content of the context set and the semantic content of the output activity data; and perform a subsequent activity generation task, subsequent to the activity generation task, comprising the one or more processors being configured to:

receive subsequent input activity data indicative of a subsequent input activity occurring within the interactive experience;

access the updated context set of entire established context data, and determine, based on relevance to the subsequent activity generation task, a further context subset of established context data from the updated context set;

access, from a further activity history database, a further set of entire activity history data in a further instance of the interactive experience, and determine, based on relevance to the subsequent activity generation task, a further subset of activity history data from the further set; and determine, using a further activity model in the form of a trained generative ML model, subsequent output activity data indicative of a subsequent output activity to be performed by a further NPC, based on the received subsequent input activity data, the further context subset of established context data, and the further subset of activity history data, and control the further NPC to perform the determined subsequent output activity.

20. A method of updating a context database storing a context set of entire established context data within an interactive experience, the method comprising, at one or more processors:

receiving output activity data indicative of an output activity to be performed by a non-player character (NPC), of one or more NPCs, in an instance of the interactive experience, or receiving input activity data indicative of an input activity to be performed by a player character (PC) in the instance of the interactive experience;

receiving second output activity data indicative of a second output activity to be performed by a second NPC, of the one or more NPCs, in a second instance of the interactive experience, or receiving second input activity data indicative of a second input activity to be performed by a second PC in the second instance of the interactive experience;

identifying that the output activity data or input activity data is received prior to the second output activity data or second input activity data;

performing an update task, comprising:

characterizing semantic content of the context set of entire established context data;

characterizing semantic content of the received output activity data or input activity data; and updating the context set to obtain an updated context set based on a comparison of the semantic content of the context set and the semantic content of the output activity data or input activity data; and performing a subsequent update task, comprising:

characterizing semantic content of the updated context set of entire established context data;

characterizing semantic content of the received second output activity data or second input activity data; and updating the updated context set to obtain a further updated context set based on a comparison of the semantic content of the updated context set and the semantic content of the second output activity data or second input activity data, wherein the further updated context set is provided for use in determining subsequent output activity data indicative of activities to be performed by at least one of the one or more NPCs in the instance or the second instance of the interactive experience.

* * * * *